(12) United States Patent
Agiwal et al.

(10) Patent No.: US 10,333,658 B2
(45) Date of Patent: *Jun. 25, 2019

(54) METHOD AND APPARATUS FOR PERFORMING HYBRID AUTOMATIC REPEAT REQUEST OPERATION IN AN ASYMMETRIC MULTICARRIER COMMUNICATION NETWORK ENVIRONMENT

(71) Applicant: Samsung Electronics Co., Ltd., Suwon-si (KR)

(72) Inventors: Anil Agiwal, Bangalore (IN); Anshuman Nigam, Bangalore (IN); Young-Bin Chang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,931

(22) Filed: Apr. 10, 2017

(65) Prior Publication Data

US 2017/0214496 A1 Jul. 27, 2017

Related U.S. Application Data

(63) Continuation of application No. 14/436,435, filed as application No. PCT/KR2013/009257 on Oct. 16, 2013, now Pat. No. 9,660,771.

(30) Foreign Application Priority Data

Oct. 16, 2012 (IN) ............................ 4321/CHE/2012
Oct. 11, 2013 (IN) .......................... 4321/CHE/ 2012

(51) Int. Cl.
*H04L 1/18* (2006.01)
*H04W 72/04* (2009.01)

(52) U.S. Cl.
CPC .......... *H04L 1/1887* (2013.01); *H04L 1/1816* (2013.01); *H04L 1/1896* (2013.01); *H04W 72/0406* (2013.01); *H04W 72/0446* (2013.01)

(58) Field of Classification Search
CPC ....... H04L 1/1812–1822; H04L 1/1854; H04L 1/1861; H04L 1/1864; H04L 1/1887; H04L 1/1893; H04L 1/1896
See application file for complete search history.

(56) References Cited

U.S. PATENT DOCUMENTS

2010/0074211 A1   3/2010   Kim et al.
2010/0260130 A1   10/2010  Earnshaw et al.
(Continued)

FOREIGN PATENT DOCUMENTS

WO      WO 2011/157233 A1    12/2011

OTHER PUBLICATIONS

International Search Report dated Jan. 16, 2014 in connection with International Patent Application No. PCT/KR2013/009257, 3 pages.
(Continued)

*Primary Examiner* — Pao Sinkantarakorn

(57) ABSTRACT

Hybrid Automatic Repeat Request (HARQ) operation in an asymmetric multicarrier communication network environment is performed, in one embodiment, by receiving resource allocation information from a base station, transmitting the HARQ packet to the base station in a transmit time interval (TTI) corresponding a first or second partition of an uplink allocation interval on a second carrier, and receiving HARQ feedback information corresponding to a previous HARQ packet transmission. A TTI in a subsequent uplink allocation interval is determined based on the partition of the uplink allocation interval in which the HARQ packet is transmitted if the HARQ feedback information indicates negative acknowledgement. The HARQ packet is
(Continued)

transmitted to the base station in the determined transmit time interval of the subsequent uplink allocation interval on the second carrier.

16 Claims, 18 Drawing Sheets

(56) References Cited

U.S. PATENT DOCUMENTS

| | | |
|---|---|---|
| 2011/0096735 A1 | 4/2011 | Damnjanovic et al. |
| 2012/0026963 A1 | 2/2012 | Kim et al. |
| 2012/0069802 A1 | 3/2012 | Chen et al. |
| 2014/0362832 A1 | 12/2014 | Rudolf et al. |

OTHER PUBLICATIONS

Written Opinion of International Searching Authority dated Jan. 16, 2014 in connection with International Patent Application No. PCT/KR2013/009257, 5 pages.

METHOD AND APPARATUS FOR PERFORMING HYBRID AUTOMATIC REPEAT REQUEST OPERATION IN AN ASYMMETRIC MULTICARRIER COMMUNICATION NETWORK ENVIRONMENT

CROSS-REFERENCE TO RELATED APPLICATIONS AND PRIORITY CLAIM

The present application is a continuation of U.S. Non-Provisional patent application Ser. No. 14/436,435 filed on Apr. 16, 2015, which claims priority under 35 U.S.C. § 365 to International Patent Application No. PCT/KR2013/009257 filed Oct. 16, 2013 and entitled "METHOD AND APPARATUS FOR PERFORMING HYBRID AUTOMATIC REPEAT REQUEST OPERATION IN AN ASYMMETRIC MULTICARRIER COMMUNICATION NETWORK ENVIRONMENT," which claims priority under 35 U.S.C. § 365 and/or 35 U.S.C. § 119(a) to Indian Patent Application No. 4321/CHE/2012 filed Oct. 16, 2012 and Indian Patent Application No. 4321/CHE/2012 filed Oct. 11, 2013. The above-identified patent documents are incorporated herein by reference into the present disclosure as if fully set forth herein.

TECHNICAL FIELD

The present disclosure generally relates to the field of asymmetric multicarrier communication system, and more particularly relates to performing hybrid automatic repeat request (ARQ) operation in an asymmetric multicarrier communication network environment.

BACKGROUND

In the recent years, several broadband wireless technologies have been developed to meet growing number of broadband subscribers and to provide more and better applications and services. For example, the Third Generation Partnership Project 2 (3GPP2) developed Code Division Multiple Access 2000 (CDMA 2000), 1× Evolution Data Optimized (1×EVDO) and Ultra Mobile Broadband (UMB) systems. The $3^{rd}$ Generation Partnership Project (3GPP) developed Wideband Code Division Multiple Access (WCDMA), High Speed Packet Access (HSPA) and Long Term Evolution (LTE) systems. The Institute of Electrical and Electronics Engineers developed Mobile Worldwide Interoperability for Microwave Access (WiMAX) systems. As more and more people become users of mobile communication systems and more and more services are provided over these systems, there is an increasing need for mobile communication system with large capacity, high throughput, lower latency and better reliability.

Super Mobile Broadband (SMB) system based on millimeter waves, i.e., radio waves with wavelength in range of 1 millimeter (mm) to 10 mm, which corresponds to a radio frequency of 30 Gigahertz (GHz) to 300 GHz, is a candidate for next generation mobile communication technology as vast amount of spectrum is available in millimeter Wave (mmWave) band. In general, an SMB network consists of multiple SMB base stations (BSs) that cover a geographic area. In order to ensure good coverage, SMB base stations need to be deployed with higher density than macro-cellular base stations. In general, SMB base stations are recommended to be deployed roughly at the same site-to-site distance as microcell or Pico-cell deployment in an urban environment. Typically, transmission and/or reception in an SMB system are based on narrow beams, which suppress the interference from neighboring SMB base stations and extend the range of an SMB link using directional antennas. However due to high path loss, heavy shadowing and rain attenuation reliable transmission at higher frequencies is one of the key issues that need to be overcome in order to make SMB system a practical reality.

Lower frequencies in a cellular band having robust link characteristics can be utilized with higher frequencies in an mmWave band to overcome reliability issues in the SMB system. In an asymmetric multicarrier communication network environment, a mobile station (MS) communicates with a base station (BS) using asymmetric multiband carriers consisting of at least one low frequency carrier in the cellular band and at least one high frequency carrier in the mmWave band. The primary carrier i.e., carrier operating on low frequencies and the secondary carrier i.e., carrier operating on high frequencies may be transmitted by same BS or different BS. Since the transmission characteristics of low frequency carriers in the cellular band and high frequency carriers in the mmWave band are quite different, transmission time intervals (TTIs) and frame structures for the primary carrier and the secondary carrier may not be the same.

In an asymmetric multicarrier SMB network, low frequency carrier in a cellular band can be used to signal Hybrid Automatic Repeat Request (HARQ) control information (e.g., resource allocation (RA) and/or HARQ feedback or both) in order to gain on transmission reliability which is one of the prime challenges in mmWave transmission. In the conventional multicarrier system in which control regions of a primary carrier are used for transmitting RA and HARQ control information for a HARQ packet transmitted on a secondary carrier, HARQ operation timing is same as that of primary carrier as transmit time interval (TTI), feedback interval and retransmission interval for transmission of HARQ packet on the secondary carrier are same as that of the primary carrier.

An exemplary conventional multicarrier HARQ operation in downlink (DL) is illustrated in FIG. 1C. In FIG. 1C, resources are allocated for transmission of HARQ packet on a secondary DL carrier using a Packet Data Control Channel (PDCCH) transmitted on the primary carrier. The resources are allocated every scheduling interval for time duration equal to the scheduling interval. The time duration for which the resources are allocated is referred to as DL allocation interval. The DL allocation interval and scheduling interval is equal to 1 subframe i.e. 1 ms. The PDCCH in subframe on the primary carrier indicates resources for a DL allocation interval of the secondary DL carrier where the DL allocation interval is aligned with the subframe of the primary carrier indicating resources for the DL allocation interval. One HARQ process is assigned to one mobile station in the DL allocation interval in the secondary carrier. One HARQ process constitutes one HARQ packet transmission (including the retransmissions and its feedback). One HARQ packet spans time duration of the DL allocation interval and a single HARQ packet is transmitted to the mobile station in a single DL allocation interval. One DL allocation interval is also the transmit time interval (TTI) for a HARQ packet.

In an exemplary DL HARQ operation, the HARQ packet transmitted to the mobile station in the DL allocation interval is received and processed by the mobile station and the HARQ feedback is sent by the mobile station after fixed number of subframes using a feedback channel (i.e., Physical Uplink Common Control Channel (PUCCH)) on the primary uplink carrier. Based on the HARQ feedback of the previous transmission, the base station determines whether to retransmit the HARQ packet or not. The base station retransmits the HARQ packet and indicates the resources for the same by transmitting the PDCCH. Multiple HARQ processes may exist between the mobile station and the base station. All HARQ processes follow same method of HARQ operation with respect to resource adaptation after processing previous HARQ packet transmission, retransmission TTI is present after TTI in which the HARQ feedback is received by the base station, and transmission of HARQ packet is performed after the HARQ feedback is received by the base station.

An exemplary conventional multicarrier HARQ operation in uplink (UL) is illustrated in FIG. 1D. The resources are allocated for packet transmission on a secondary UL carrier using a packet data control channel (PDCCH) transmitted on a primary carrier. The resources are allocated every scheduling interval for time duration equal to the scheduling interval. Generally, the time duration for which the resources are allocated is referred as UL allocation interval. The UL allocation interval and the scheduling interval are equal to 1 subframe i.e. 1 ms. The PDCCH in a subframe on the primary carrier indicates resources for an UL allocation interval of a secondary UL carrier wherein the UL allocation interval is at a fixed offset from the subframe in the primary carrier indicating resources for the UL allocation interval.

One HARQ process is assigned to a single mobile station in UL allocation interval in the secondary carrier. One HARQ process constitutes one HARQ packet transmission (including the retransmissions and its feedback). One HARQ packet spans duration of UL allocation interval in time and a single HARQ packet is allowed to be transmitted by the mobile station. One allocation interval is also the transmit time interval (TTI) for a HARQ packet.

In an exemplary UL HARQ operation, the HARQ packet transmitted by the mobile station in the UL allocation interval is received and processed by the base station and the HARQ feedback is sent by the base station after fixed number of subframes using a HARQ feedback channel (i.e., Physical HARQ Feedback Indicator Channel (PHICH)) on the primary DL carrier. Based on the HARQ feedback of the previous transmission, the mobile station determines whether to retransmit the HARQ packet or not. In case of uplink HARQ operation, the UL allocation interval for retransmitting the HARQ packet is at a fixed place with respect to previous transmission and same resources as assigned for the previous transmission are used. The base station may change the resources in the UL allocation interval corresponding to the retransmission of HARQ packet. Multiple HARQ processes may exist between the mobile station and the base station. All HARQ processes follow same method of HARQ operation, viz. resource adaptation after processing previous HARQ packet transmission, retransmission TTI is present after the TTI in which the HARQ feedback is received by the mobile station, and transmission of HARQ packet is performed after the HARQ feedback is received by the mobile station.

In case of asymmetric multicarrier communication network, transmit time interval (TTI), feedback interval and retransmission interval for transmission of a HARQ packet on a high frequency carrier are much smaller than those of transmission of a HARQ packet on a low frequency carrier.

SUMMARY

A method of HARQ operation is needed in order to utilize control regions on a low frequency carrier for transmission of HARQ packet on a high frequency carrier where transmit time interval, feedback interval and retransmission interval are much smaller than those of transmission of HARQ packet on a low frequency carrier and the control regions for carrying resource allocation and HARQ control information on the low frequency carrier is fixed based on scheduling and transmit time interval of a HARQ packet on the low frequency carrier.

An aspect of the present disclosure addresses at least the above-mentioned problems and/or disadvantages and to provide at least the advantages described below. Accordingly, an aspect of the present disclosure is to provide a method and an apparatus for performing HARQ operation in an asymmetric multicarrier communication network environment.

In accordance with an aspect of the present disclosure, a method of performing an uplink hybrid automatic repeat request (HARQ) operation in an asymmetric multicarrier communication network environment is provided. The method includes receiving, by a mobile station, resource allocation information for transmitting a new HARQ packet in a resource allocation region in a scheduling interval of a first carrier from a base station; transmitting the HARQ packet to the base station in a transmit time interval corresponding one of a first partition and a second partition of an uplink allocation interval on a second carrier based on the resource allocation information; receiving HARQ feedback information corresponding to the previous HARQ packet transmission in a HARQ feedback control region on the first carrier from the base station; determining a transmit time interval for HARQ packet retransmission based on the partition of the uplink allocation interval in which the previous HARQ packet transmission occurred and associated retransmission interval if the HARQ feedback information indicates negative acknowledgement of the previous HARQ packet transmission; and retransmitting the HARQ packet to the base station in the determined transmit time interval of the subsequent uplink allocation interval on the second carrier, wherein the determined transmit time interval is at a first re-transmission interval from the transmit time interval of the previous HARQ packet transmission if the first HARQ packet is transmitted in the first partition of the uplink allocation interval, and wherein the determined transmit time interval is at a second re-transmission interval from the transmit time interval of the previous HARQ packet transmission if the first HARQ packet is transmitted in the second partition of the uplink allocation interval.

The drawings described herein are for illustration purposes only and are not intended to limit the scope of the present disclosure in any way.

DETAILED DESCRIPTION

The present disclosure describes a method and system for performing Hybrid Automatic Repeat Request (HARQ) operation in an asymmetric multicarrier communication network environment. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

Figure 1A:
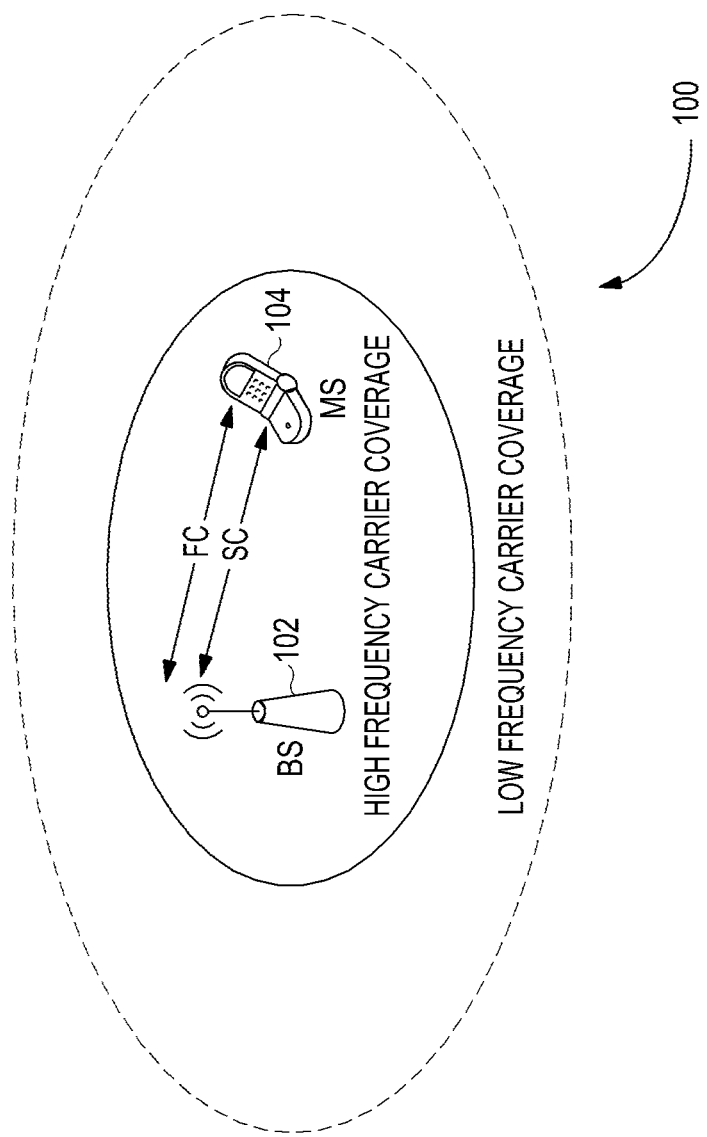
FIG. 1A is a schematic diagram depicting an asymmetric multicarrier communication network system in which data on a first carrier and a second carrier are transmitted by same base station (BS), in context of the disclosure.
Figure 1B:
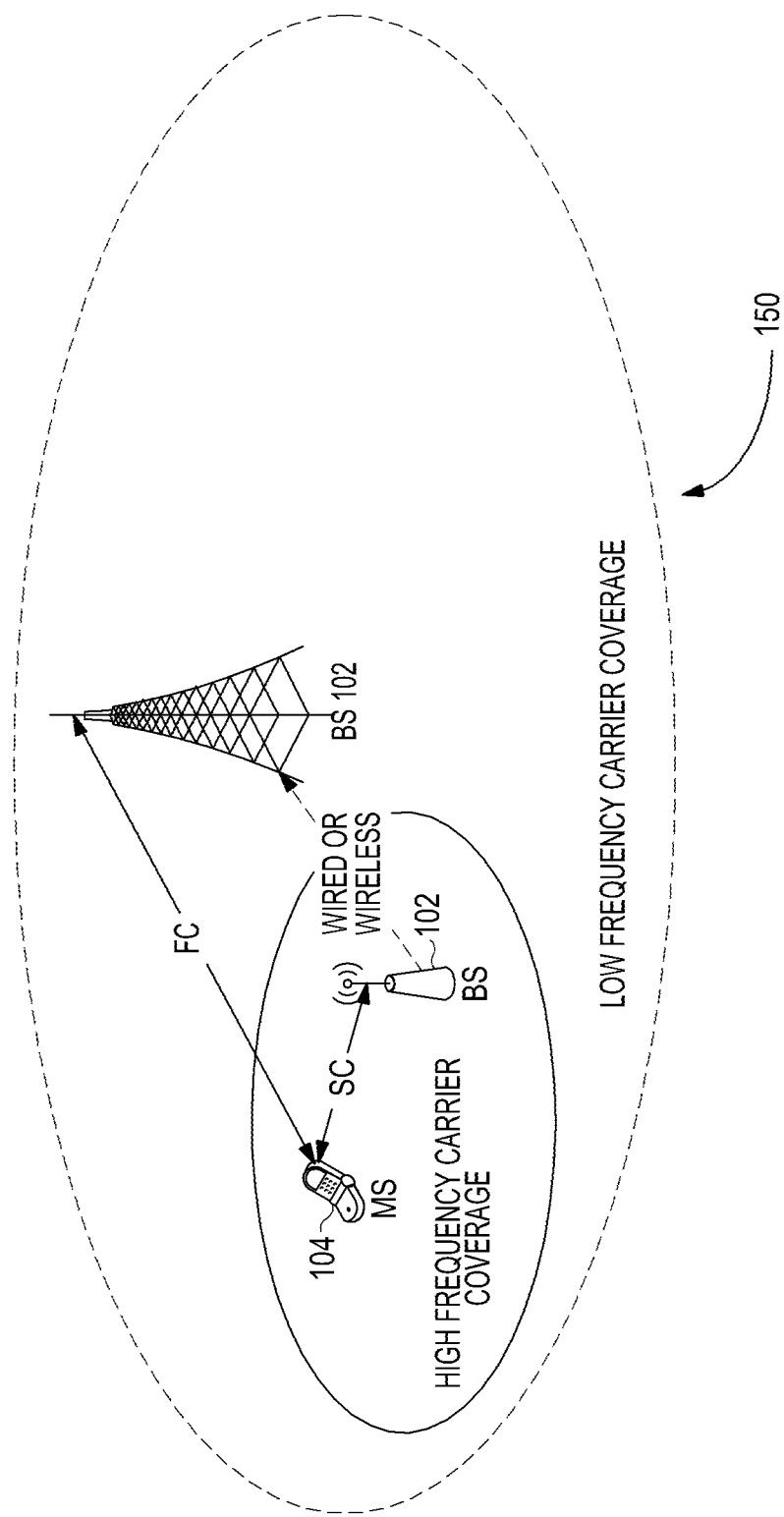
FIG. 1B is a schematic diagram depicting another asymmetric multicarrier communication network system in which data on a first carrier and a second carrier are transmitted by different BSs, in the context of the disclosure.
Figure 1C:
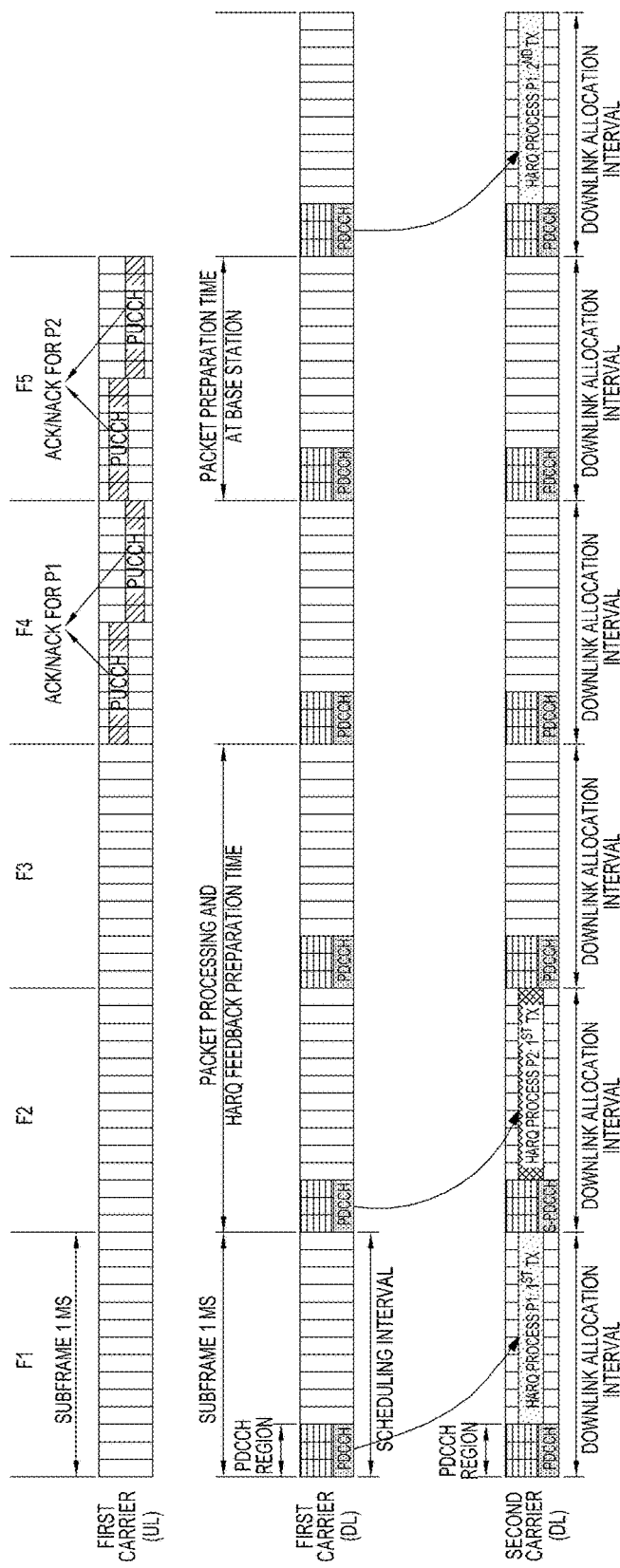
FIG. 1C is a schematic representation depicting a conventional downlink hybrid automatic repeat request (HARQ) operation.
Figure 1D:
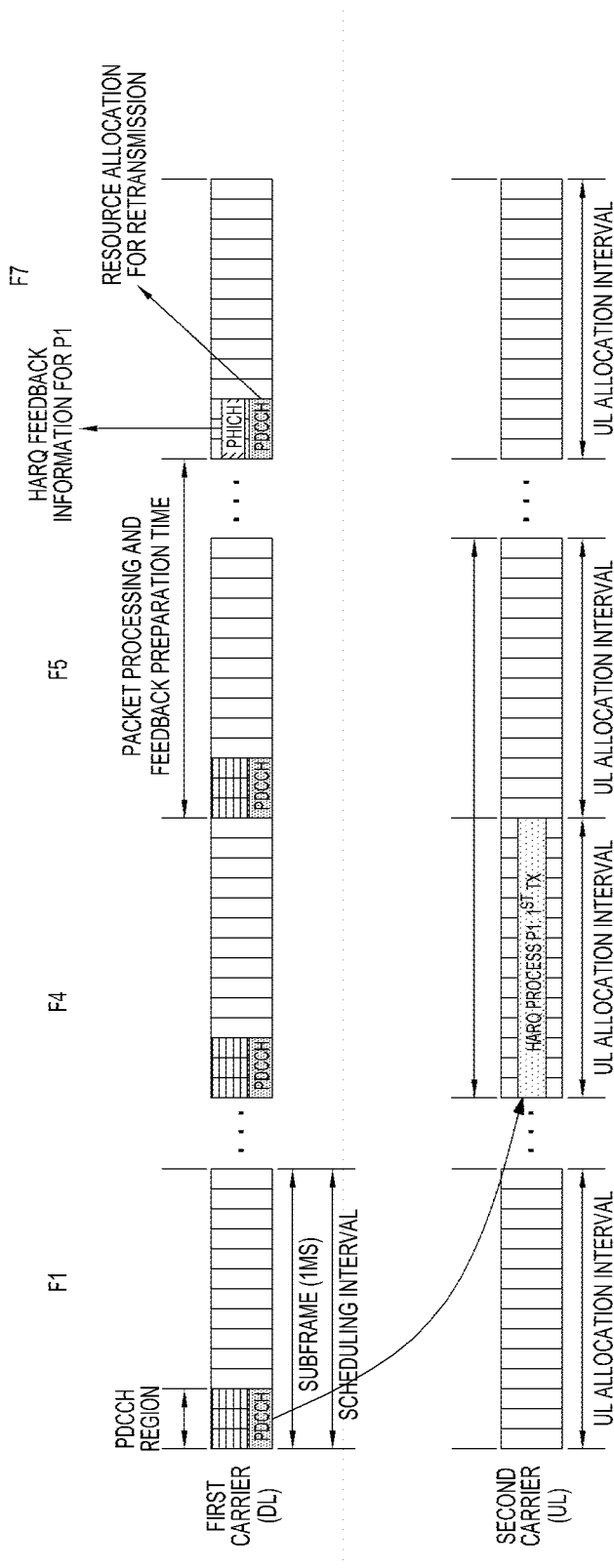
FIG. 1D are schematic representations depicting a conventional uplink HARQ operation.

In an asymmetric multicarrier communication network, a mobile station (MS) communicates with a base station (BS) using asymmetric carriers consisting of at least one low frequency carrier in a cellular band and at least one high frequency carrier in a millimeter Wave band. The first carrier, i.e., carrier operating on low frequency, is used to transmit control information including resource allocation information and HARQ control information (e.g., HARQ feedback information) for a second carrier, i.e., carrier operating on high frequency. The first carrier and the second carrier may be transmitted by same base station (BS) or different BS. FIG. 1a is a schematic diagram 100 depicting an asymmetric multicarrier communication network system in which data on the first carrier and the second carrier are transmitted and received by same BS 102. FIG. 1b is a schematic diagram 150 depicting another asymmetric multicarrier communication network system in which data on the first carrier and second carrier are transmitted and received by different BSs 102. In asymmetric multicarrier communication network, transmit time interval (TTI), HARQ feedback interval, and HARQ packet retransmission interval for the low frequency carrier are different than those of the high frequency carrier. The present disclosure is applicable to any asymmetric multicarrier communication network system, wherein at least one of TTI, HARQ feedback interval, and HARQ packet retransmission interval on the first carrier are different than HARQ packet transmission on a second carrier.

For the purpose explanation, low frequency carrier operation as defined in Third Generation Partnership Project (3GPP) Long Term Evolution (LTE) system is considered. However, the present disclosure is equally applicable to any other cellular broadband system.

Figure 2A:
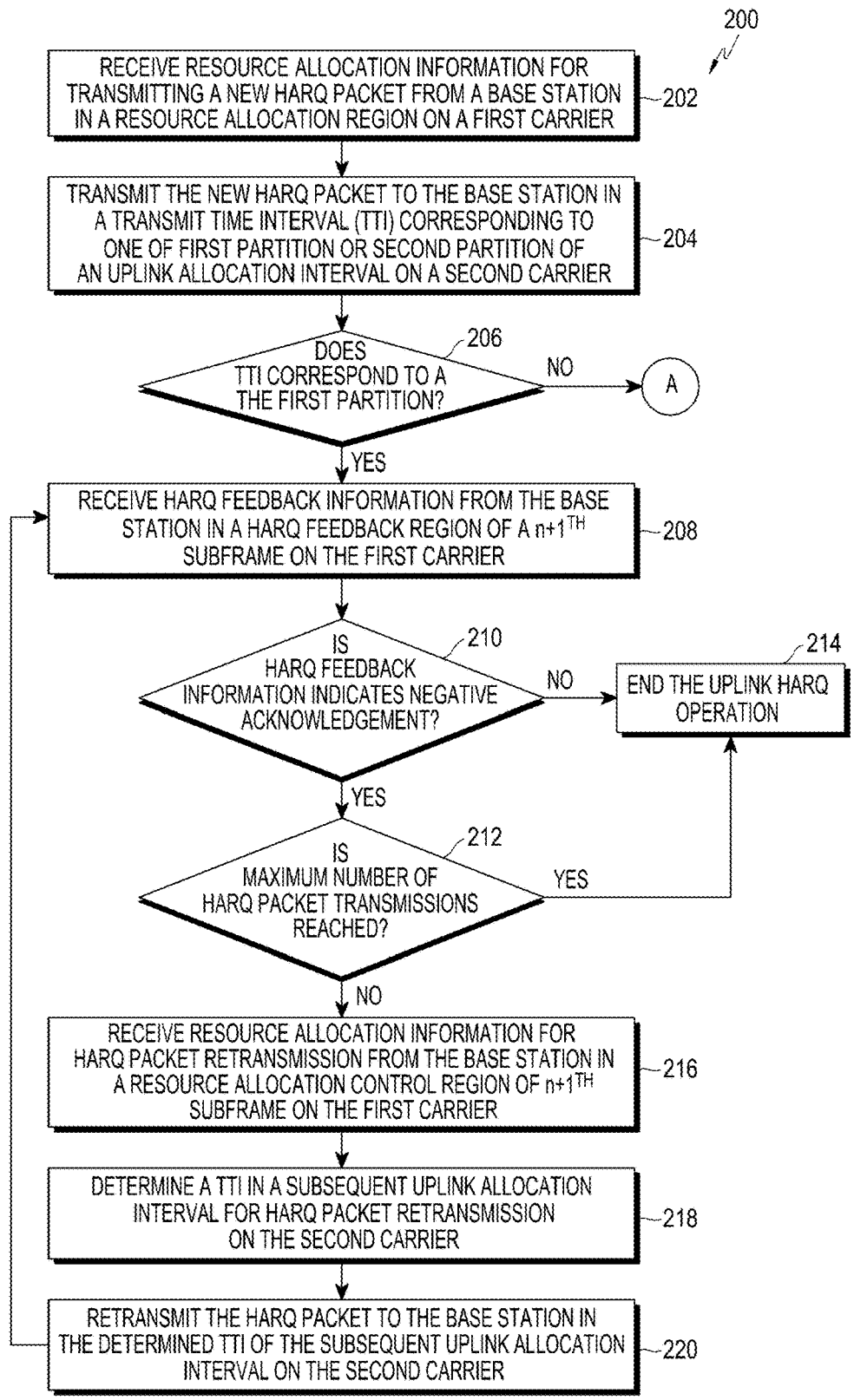
FIGS. 2A and 2B are a process flowchart illustrating an exemplary method of performing uplink HARQ operation in an asymmetric multicarrier communication network system, according to one embodiment.
Figure 2B:
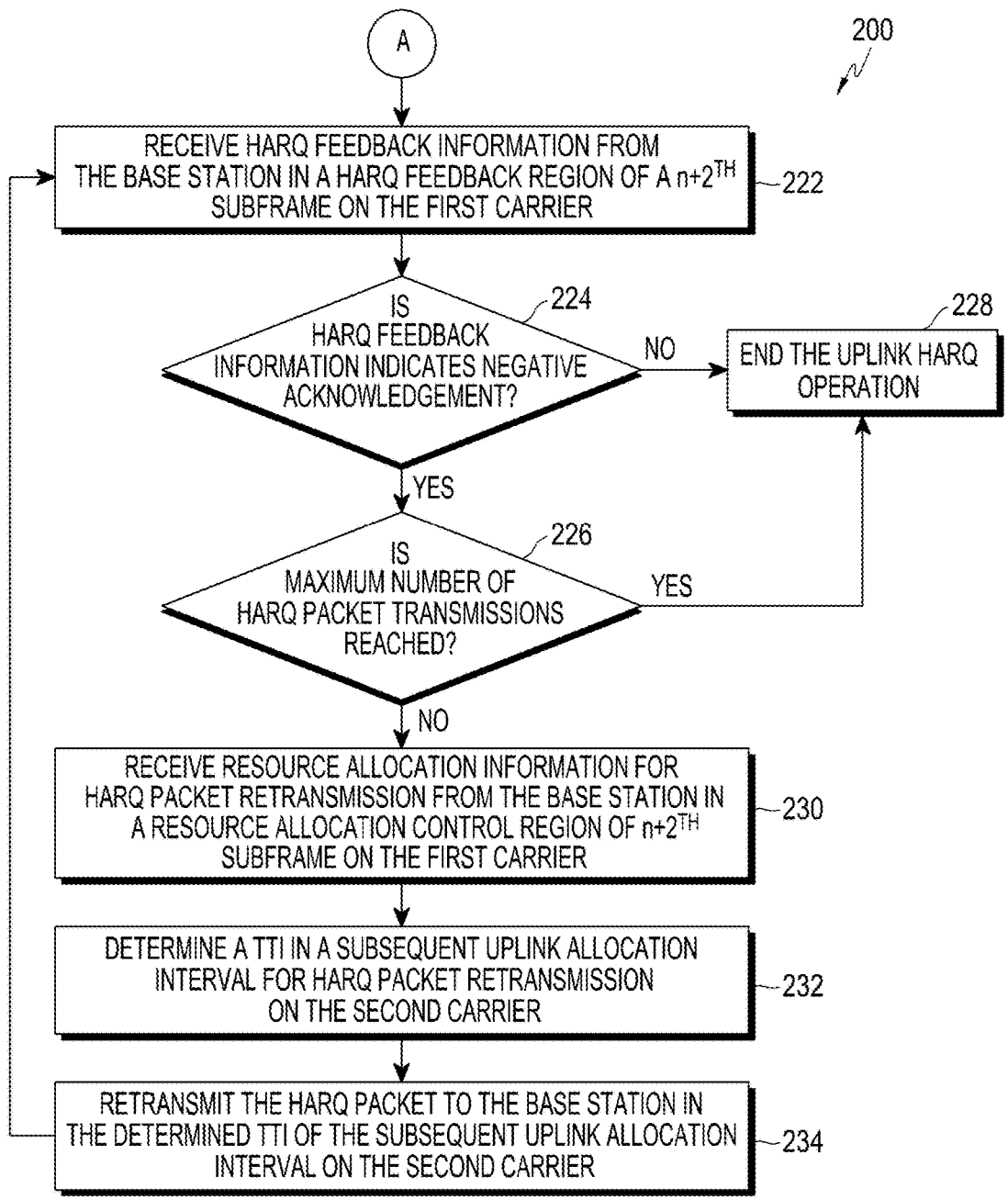

FIGS. 2A and 2B are a process flowchart 200 illustrating an exemplary method of performing uplink hybrid automatic repeat request (HARQ) operation in an asymmetric multicarrier communication network system 100, according to one embodiment. At step 202, resource allocation information for transmitting a new HARQ packet is received from a base station 102 in a resource allocation region on a first carrier (e.g., low frequency carrier based on Long Term Evolution Technology (LTE)). In some embodiments, the resource allocation information indicates resources (e.g., frequency and time resources), and a transmit time interval (TTI) in an uplink allocation interval of a second carrier (e.g., a high frequency carrier based on millimeter wave band) for transmitting a new HARQ packet on the second carrier.

At step 204, the new HARQ packet is transmitted to the base station 102 in a transmit time interval corresponding to one of a first partition and a second partition of the uplink allocation interval on the second carrier based on the resource allocation information. For example, each uplink allocation interval is divided into two partitions, viz first partition and second partition. Timing of HARQ feedback, retransmission and resource allocation for HARQ packets corresponding to a HARQ process whose first HARQ packet transmission started in the first partition of the uplink allocation interval is based on a first type of HARQ process. Similarly, timing of HARQ feedback, re-transmission and resource allocation for HARQ packets corresponding to a HARQ process whose first HARQ packet transmission started in the second partition of the uplink allocation interval is based on a second type of HARQ process.

At step 206, it is determined whether the transmit time interval in which new HARQ packet is transmitted correspond to the first partition of the uplink allocation interval. If the transmit time interval corresponds to the first partition, then at step 208, HARQ feedback information is received from the base station 102 in a HARQ feedback control region of a $n+1^{th}$ subframe on the first carrier, where n is a subframe number corresponding to the uplink allocation interval in which the HARQ packet was transmitted at step 204.

At step 210, it is determined whether the HARQ feedback information indicates negative acknowledgement of the HARQ packet transmitted in the uplink allocation interval. If the HARQ feedback information indicates negative acknowledgment, at step 212, it is determined whether maximum number of HARQ packet transmissions is reached. If the HARQ feedback information indicates positive acknowledgement or the maximum number of HARQ packet transmissions is reached, the uplink HARQ packet operation is ended, at step 214.

If the maximum number of HARQ packet transmissions is not reached, then at step 216, resource allocation information is received from the base station 102 in a resource allocation control region of n+1$^{th}$ subframe on the first carrier, where n is a subframe number corresponding to the uplink allocation interval in which the HARQ packet was transmitted at step 204. The resource allocation information may be already known to the mobile station 104 for retransmitting the HARQ packet. In such case, at step 216, the mobile station 104 may receive modified resource allocation information from the base station 102. The resource allocation control region in which the resource allocation information is received is determined based on the partition of the uplink allocation interval in which the HARQ packet associated with the previous HARQ packet transmission is transmitted. It can be noted that, the step 216 is optionally performed when the base station 102 allocates new resources or modifies the allocated resources for retransmitting the HARQ packet.

At step 218, transmit time interval (TTI) in a subsequent uplink allocation interval for retransmission of the HARQ packet on the second carrier is determined. The location of TTI for retransmission of the HARQ packet is determined based on the partition in the uplink allocation interval in which the first HARQ packet transmission has occurred for the HARQ packet. Since, the HARQ packet corresponding to the first HARQ packet transmission is transmitted in the first partition of the uplink allocation interval, the TTI for the retransmission of the HARQ packet is located at a first re-transmission interval from the TTI in which the HARQ packet corresponding to the previous HARQ packet transmission is transmitted. It is understood that, the previous HARQ packet transmission refers to HARQ packet transmission for which the HARQ feedback information is received in the n+1$^{th}$ subframe. At step 220, the HARQ packet is retransmitted to the base station 102 in the determined TTI of the subsequent uplink allocation interval on the second carrier based on the resource allocation information. The steps 208 to 220 are repeated till the base station 102 successfully receives the HARQ packet (i.e., when the HARQ feedback information indicates positive acknowledgement) or the maximum number of HARQ packet transmissions is reached.

If, at step 206, it is determined that the transmit time interval corresponds to the second partition, then at step 222, HARQ feedback information is received from the base station 102 in a HARQ feedback control region of a n+2$^{th}$ subframe on the first carrier, where n is a subframe number corresponding to the uplink allocation interval in which the HARQ packet was transmitted at step 204.

At step 224, it is determined whether the HARQ feedback information indicates negative acknowledgement of the HARQ packet transmitted in the uplink allocation interval. If the HARQ feedback information indicates negative acknowledgment, at step 226, it is determined whether maximum number of HARQ packet transmissions is reached. If the HARQ feedback information indicates positive acknowledgement or the maximum number of HARQ packet transmissions is reached, the uplink HARQ packet operation is ended, at step 228.

If the maximum number of HARQ packet transmissions is not reached, then at step 230, resource allocation information is received from the base station 102 in a resource allocation control region of n+2$^{th}$ subframe on the first carrier, where n is a subframe number corresponding to the uplink allocation interval in which the HARQ packet was transmitted at step 204. The resource allocation information may be already known to the mobile station 104 for retransmitting the HARQ packet. In such case, at step 230, the mobile station 104 may receive modified resource allocation information from the base station 102. In some embodiments, the resource allocation control region in which the resource allocation information is received is determined based on the partition of the uplink allocation interval in which the HARQ packet associated with the previous HARQ packet transmission is transmitted. It can be noted that, the step 230 is optionally performed when the base station 102 allocates new resources or modifies the allocated resources for retransmitting the HARQ packet.

At step 232, transmit time interval (TTI) for retransmission of the HARQ packet on the second carrier is determined. The location of TTI for retransmission of the HARQ packet is determined based on the partition in the uplink allocation interval in which the first HARQ packet transmission has occurred for the HARQ packet. Since, the HARQ packet corresponding to the first HARQ packet transmission is transmitted in the second partition of the uplink allocation interval, the TTI for the retransmission of the HARQ packet is located at a second retransmission interval from the TTI in which the HARQ packet corresponding to the previous HARQ packet transmission is transmitted. It is understood that, the previous HARQ packet transmission refers to HARQ packet transmission for which the HARQ feedback information in received in the n+2$^{th}$ subframe. At step 234, the HARQ packet is retransmitted to the base station 102 in the determined TTI of the subsequent uplink allocation interval on the second carrier based on the resource allocation information. The steps 222 to 234 are repeated till the base station 102 successfully receives the HARQ packet (i.e., when the HARQ feedback information indicates positive acknowledgement) or the maximum number of HARQ packet transmissions is reached.

Figure 3:
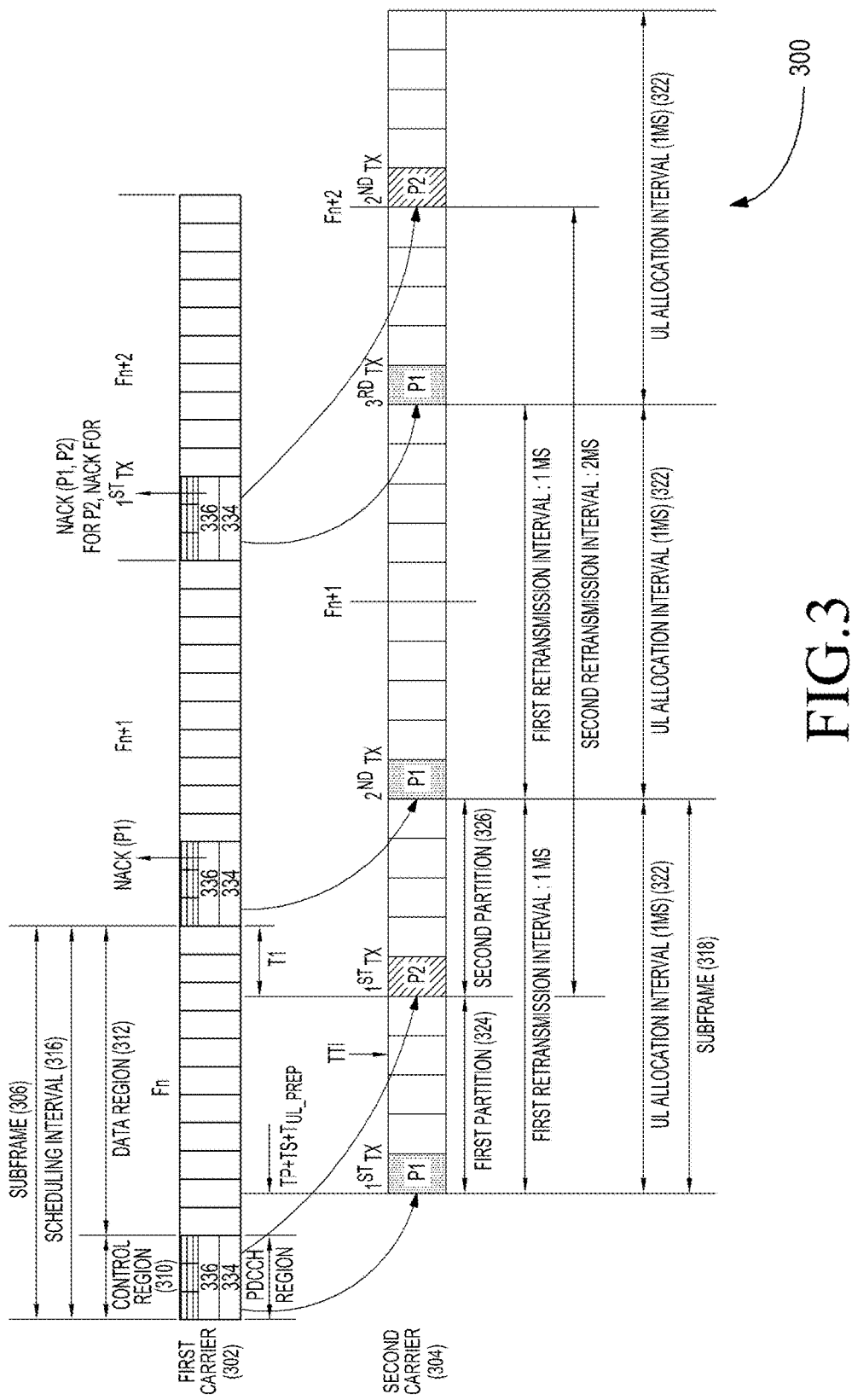
FIG. 3 is schematic representation depicting an uplink HARQ operation, according to one embodiment.

FIG. 3 is schematic representation 300 depicting an uplink HARQ operation, according to one embodiment. Particularly, FIG. 3 illustrates a schematic representation of a first carrier 302 and a second carrier 304. The first carrier 302 may be a low frequency carrier and the second carrier 304 may be a high frequency carrier. In an exemplary implementation, the first carrier 302 may be a primary carrier and the second carrier 304 may be a secondary carrier. In another exemplary implementation, the first carrier 302 may be a first secondary carrier and the second carrier 304 may be a second secondary carrier. It can be seen that from FIG. 3 that, the second carrier 304 is asymmetric carrier with respect to the first carrier 302, wherein HARQ control information is sent on the first carrier 304 and HARQ packet is sent on the second carrier 304.

Each subframe 306 associated with the first carrier 302 includes a control region 310 and a data region 312. For example, each subframe 306 is 1 ms in size and is divided into ten slots 314, each slots is of 0.1 ms size. A scheduling interval 316 of the first carrier 302 spans an entire subframe 306. The control region 310 is divided into a resource allocation control region 334 and a HARQ feedback region 336.

Each subframe 318 is associated with the second carrier 304. An uplink allocation interval 322 in the second carrier 304 is aligned with boundary of the subframe 318 in the second carrier 304. However, the uplink allocation interval 322 can be offset from the boundary of the subframe 306 in the first carrier 302. The uplink allocation interval 322 is a time duration for which the resource allocation control region 334 of the subframe 306 on the first carrier 302 indicates resources allocated for transmission of HARQ packets in uplink direction on the second carrier 304. Further, the uplink allocation interval 322 is offset ($T_P+T_s+T_{ULPrep}$) from the boundary of the end of the control region 310 of the subframe 306. The offset is equal to at least time required to process resource allocation information received in the scheduling interval 316 of the first carrier 302 and time required to generate a HARQ packet.

The uplink allocation interval 322 consists of multiple TTIs (e.g., 10 TTIs). Each TTI carries one HARQ process, where each HARQ process carries one HARQ packet. That is, multiple HARQ processes are time division multiplexed in each uplink allocation interval 322. Multiple HARQ processes may be frequency division multiplexed in one slot in addition to time division multiplexing of HARQ processes in each uplink allocation interval 322.

In the present disclosure, two types of HARQ processes (i.e., first type of HARQ process and second type of HARQ process) are defined for transmitting HARQ packet. According to embodiment illustrated in FIG. 3, a first retransmission interval associated with the first type of HARQ process is different than a second re-transmission interval of the second type of HARQ process. As shown in FIG. 3, the first re-transmission interval is of 1 millisecond and the second retransmission interval is of 2 milliseconds. In case of asynchronous transmission, retransmission interval referred herein is a minimum retransmission interval.

Each uplink allocation interval 322 is divided into a first partition 324 and a second partition 326, where a new HARQ packet of the first type of HARQ process is transmitted in the first partition 324 of the uplink allocation interval and a new HARQ packet of the second type of HARQ process is transmitted in the second partition 326 of uplink allocation interval 322. The first partition 324 includes a first set of contiguous transmit time intervals (TTIs) which corresponds to the first type of HARQ process and the second partition 326 includes a second set of contiguous transmit time intervals (TTIs) which correspond to the second type of HARQ process. For example, the first set of contiguous TTIs contains five TTIs and the second set of TTIs contains five TTIs. The size of the first partition of the uplink allocation interval 322 is equal to number of TTIs in the uplink allocation interval 322 minus the pre-determined offset (T1) minus offset minus time duration ($T_{PDCCH}$) of the resource allocation control region 334, where the offset is the time duration between the start of the uplink allocation interval 322 from the end of the control region 310 in the first carrier 302. In one exemplary implementation, the value of T1+offset+$T_{PDCCH}$ is quantized to TTI boundary. For example, if the uplink allocation interval 322 consists of ten TTIs, the size of the first partition 324 is equal to 10−(T1+offset+$T_{PDCCH}$)=5 TTIs and size of the second partition 326 is equal to T1+offset+$T_{PDCCH}$=5 TTIs.

Both the first partition 324 and the second partition 326 start at TTI boundary of the uplink allocation interval 322. The first TTI in the first set of contiguous TTIs starts at the beginning of the uplink allocation interval 322. The first TTI in the second set of contiguous TTIs is a TTI in the uplink allocation interval 322 which is at a pre-determined offset (T1) before the start of the resource allocation control region 334 in a next scheduling interval 316 of the first carrier 302. The pre-determined offset (T1) is equal to at least the time required to process a HARQ packet and time required to prepare HARQ feedback information. The pre-determined offset (T1) may also include time corresponding to timing advance. It can be noted that, maximum timing advance supported by the asymmetric multicarrier communication network system 100 may be considered to compute the pre-determined offset (T1). The predetermined offset (T1) is quantized to a TTI boundary.

As shown in FIG. 3, the base station 102 transmits resource allocation information to the mobile station 104 in the resource allocation control region 310 in the scheduling interval 316 on the first carrier 302. For example, the base station 102 transmits a Secondary Packet Data Control Channel (S-PDCCH) carrying the resource allocation information in a PDCCH region of the subframe 306 on the first carrier 302. The resource allocation information indicates resources and TTI in the uplink allocation interval 322 for transmitting a HARQ packet on the second carrier 304. The TTI indicated in the resource allocation information corresponds to one of the first partition 324 and the second partition 326 of the uplink allocation interval 322.

Consider that, the TTI corresponds to the first partition 324 of the uplink allocation interval 322. In such case, the mobile station 104 transmits a HARQ packet (P1) corresponding to a first HARQ packet transmission ($1^{st}$Tx) to the base station 102 in the TTI of the first partition 324 of the uplink allocation interval 322 according to a first type of HARQ process. It can be noted that retransmission of the HARQ packet associated with the first type of HARQ process is performed after a pre-determined first re-transmission interval. If the TTI corresponds to the second partition 326 of the uplink allocation interval 322, the mobile station 104 transmits a HARQ packet (P2) corresponding to a first HARQ packet transmission ($1^{st}$Tx) to the base station 102 in the TTI of the second partition 326 of the uplink allocation interval 322 according to a second type of HARQ process. The retransmission of the HARQ packet associated with the second type of HARQ process is performed after a pre-determined second re-transmission interval. In the embodiment illustrated in FIG. 3, the pre-determined second re-transmission interval is greater than the pre-determined first retransmission interval.

For the first type of HARQ process, consider that the base station 102 have not received the HARQ packet (P1) transmitted by the mobile station 104 in the TTI of the first partition 324 of the uplink allocation interval 322. As shown in FIG. 3, the base station 102 transmits HARQ feedback information in a Physical Hybrid-ARQ Indicator Channel (PHICH) to the mobile station 104 in a HARQ feedback region 336 of the next subframe 306 (Fn+1) on the first carrier 302. Accordingly, the mobile station 104 looks for the HARQ feedback information in a HARQ feedback region 336 of the next subframe 306 (Fn+1) on the first carrier 302 for the HARQ packet (P1) corresponding to the first HARQ packet transmission ($1^{st}$Tx) to the base station 102 in the TTI of the first partition 324 of the uplink allocation interval 322 according to the first type of HARQ process.

Since, the base station 102 has not successfully received the HARQ packet corresponding to the first HARQ packet transmission ($1^{st}$Tx), the HARQ feedback information indicates negative acknowledgement (NACK) of the first HARQ packet transmission in the TTI of the first partition 324. Hence, the base station 102 may transmit resource allocation information in the resource allocation control region 334 of the next subframe 306 (Fn+1). The resource allocation information indicates resources for transmitting the HARQ packet (P1) associated with the second HARQ packet transmission ($2^{nd}$Tx) in the first partition 324 of the next subframe 318. It can be noted that, transmission of the resource allocation information is optionally performed by the base station 102. In the absence of the resource allocation information, the mobile station 104 uses the previously assigned resources allocation information.

It is understood that, if the base station 102 would have received and processed the HARQ packet (P1) corresponding to the first HARQ packet transmission transmitted in the TTI of the first partition 324, the base station 102 would have transmitted HARQ feedback information indicating positive acknowledgement (ACK) of the first HARQ packet transmission ($1^{st}$Tx) in the HARQ feedback region 336.

For the first type of HARQ process, if the HARQ feedback information indicates negative acknowledgement (NACK) of the HARQ packet (P1) transmitted in the first partition 324, the mobile station 104 determines a TTI for performing a second HARQ packet transmission ($2^{nd}$Tx) based on the partition of the uplink allocation interval 322 in which the HARQ packet corresponding to the first HARQ packet transmission ($1^{st}$Tx) was transmitted. The TTI is located at a pre-determined first retransmission interval associated with the first type of HARQ process from the TTI corresponding to the first HARQ packet transmission ($1^{st}$Tx). Since, the first retransmission interval is 1 millisecond, the TTI would be first TTI of a first partition 324 of subsequent uplink allocation interval 322. Accordingly, the mobile station 104 transmits the HARQ packet (P1) corresponding to the second HARQ packet transmission ($2^{nd}$Tx) in the first TTI of the first partition 324 in the subsequent uplink allocation interval 322 on the second carrier 304 based on the resource allocation information.

Now, for the first type of HARQ process, consider that the base station 102 has not received the HARQ packet (P1) corresponding to the second HARQ packet transmission ($2^{nd}$Tx) transmitted in the first TTI of the first partition 324 on the second carrier 304. In such case, the base station 102 transmits HARQ feedback information in the HARQ feedback region 336 of the subframe 306 (Fn+2) on the first carrier 302 where the HARQ feedback information indicates negative acknowledgement (NACK) of the second HARQ packet transmission ($2^{nd}$Tx) performed in the first partition 324 of the uplink allocation interval 322. Accordingly, the base station 102 may transmits resource allocation information in an S-PDCCH in the resource allocation control region 334 of the subframe 306 (Fn+2) on the second carrier 304. It can be noted that, transmission of the resource allocation information is optionally performed by the base station 102. In the absence of the resource allocation information, the mobile station 102 uses the previously assigned resources allocation information.

The mobile station 104 looks for the HARQ feedback information in the HARQ feedback region 336 of the next subframe 306 (Fn+2) on the first carrier 302 for the HARQ packet (P1) corresponding to the second HARQ packet transmission (2disclosurendTx) to the base station 102 in the TTI of the first partition 324 of the uplink allocation interval 322 according to the first type of HARQ process. Since the HARQ feedback information indicates negative acknowledgement (NACK), the mobile station 104 determines a TTI for performing a third HARQ packet transmission ($3^{rd}$Tx) based on the partition of the uplink allocation interval in which the HARQ packet corresponding to the first HARQ packet transmission ($1^{st}$Tx) was transmitted. The TTI is located at a pre-determined first retransmission interval associated with the first type of HARQ process from the TTI corresponding to the second HARQ packet transmission ($2^{nd}$Tx). Since, the first retransmission interval is 1 millisecond, the TTI would be first TTI of a first partition 324 of subsequent uplink allocation interval 322. Accordingly, the mobile station 104 transmits the HARQ packet (P1) corresponding to the third HARQ packet transmission ($3^{rd}$Tx) to the base station 102 in the first TTI of the first partition 324 of the next uplink allocation interval 322 on the second carrier 304 based on the resource allocation information.

In case of second type of HARQ process, consider that the base station 102 has not received the HARQ packet (P2) corresponding to the first HARQ packet transmission ($1^{st}$Tx) transmitted in the first TTI of the second partition 326 on the second carrier 304. In such case, the base station 102 transmits HARQ feedback information in the HARQ feedback region 336 of the subframe 306 (Fn+2) on the first carrier 302 where the HARQ feedback information indicates negative acknowledgement (NACK) of the first HARQ packet transmission ($1^{st}$Tx) performed in the second partition 326 of the uplink allocation interval 322. The base station 102 may transmit resource allocation information in an S-PDCCH in the resource allocation control region 334 of the subframe 306 (Fn+2) on the second carrier 304. It can be noted that transmission of the resource allocation information by base station 102 is optional and is not always transmitted. In the absence of the resource allocation information, the mobile station 102 uses the previously assigned resources allocation information.

The mobile station 104 looks for the HARQ feedback information in a HARQ feedback region 336 of the subframe 306 (Fn+2) on the first carrier 302 for the HARQ packet (P2) corresponding to the first HARQ packet transmission ($1^{st}$Tx) to the base station 102 in the TTI of the second partition 324 of the uplink allocation interval 322 according to the second type of HARQ process. Since the HARQ feedback information indicates negative acknowledgement (NACK), the mobile station 104 determines a TTI for performing a second HARQ packet transmission ($2^{nd}$Tx) based on the partition of the uplink allocation interval in which the HARQ packet corresponding to the first HARQ packet transmission ($1^{st}$Tx) was transmitted. The TTI is located at a pre-determined second retransmission interval associated with the second type of HARQ process from the TTI corresponding to the first HARQ packet transmission ($1^{st}$Tx). Since the second retransmission interval is 2 milliseconds, the TTI would be first TTI of a second partition 326 of subsequent uplink allocation interval 322 (e.g., $n+2^{th}$ uplink allocation interval). Accordingly, the mobile station 104 transmits the HARQ packet (P2) corresponding to a second HARQ packet transmission ($2^{nd}$Tx) to the base station 102 in the first TTI of the second partition 326 of the next uplink allocation interval 322 on the second carrier 304 based on the resource allocation information.

It can be noted that the resource for HARQ packet retransmission for the first type and second type of HARQ process can be adapted by the base station 102 after reception and processing of the HARQ feedback information such that HARQ packet transmission of the first type of HARQ process starts in the first partition 324 of the uplink allocation interval 322 and HARQ packet transmission of the second type of HARQ process starts in the second partition 326 of the uplink allocation interval 322.

The resources for the first type of HARQ process can be adapted in a resource allocation region of a resource allocation control region (PDCCH) of a subsequent subframe while resources for the second type of HARQ process can be adapted in a resource allocation region of next to the subsequent subframe. Therefore, in the embodiment illustrated in FIG. 3, the first retransmission interval (i.e., 1 ms) for the first type of HARQ process is equal to subframe duration while the second retransmission interval (i.e., 2 ms) for the second type of HARQ process is equal to twice the subframe duration.

Figure 4:
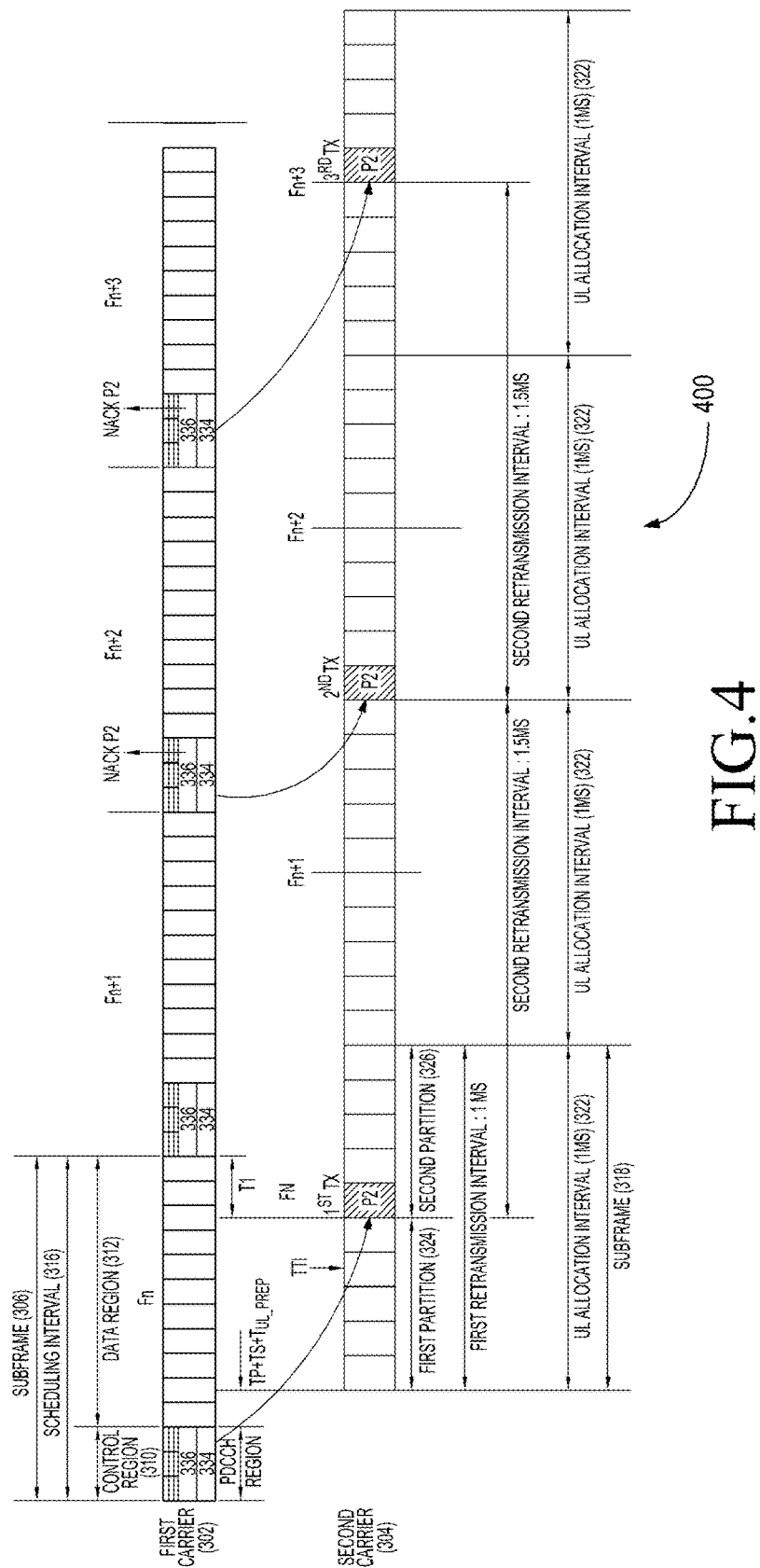
FIG. 4 is a schematic representation depicting an uplink HARQ operation, according to another embodiment.

FIG. 4 is a schematic representation 400 depicting an uplink HARQ operation, according to another embodiment. It can be seen that the schematic representation 400 of FIG. 4 is similar to the schematic representation 300 of FIG. 3, except the value of the second retransmission interval associated with the second type of HARQ process. The minimum value of the first retransmission interval for asynchronous downlink HARQ operation may range from 1 millisecond+T1+$T_{PDCCH}$+$T_P$+$T_S$+$T_{UL\_PREP}$ to 1 millisecond and minimum value of the second retransmission interval for asynchronous downlink HARQ operation may range from 1 millisecond+T1+$T_{PDCCH}$+$T_P$+$T_S$+$T_{UL\_PREP}$. Similarly, for synchronous downlink HARQ operation, the value of the first retransmission interval is 1 millisecond while the value of the second retransmission interval is 1 millisecond+T1+$T_{PDCCH}$+$T_P$+$T_S$+$T_{UL\_PREP}$. In FIG. 4, since the second retransmission interval is equal to 1.5 milliseconds, TTI for HARQ packet transmission which started in the second partition 326 of the uplink allocation interval 322 may be a TTI of a first partition 324 or a second partition 326 of the uplink allocation interval 322 during subsequent retransmission of the HARQ packet. It can be noted that, unlike embodiment of FIG. 3, the TTI for retransmission of HARQ packet associated with the second type of HARQ process may belong to a first partition or a second partition 326 of the uplink allocation interval 322. As can be seen in FIG. 3, the TTI for retransmission of the HARQ packet associated with the second type of HARQ process is always belongs to the second partition 326 of the uplink allocation interval 322.

Figure 5:
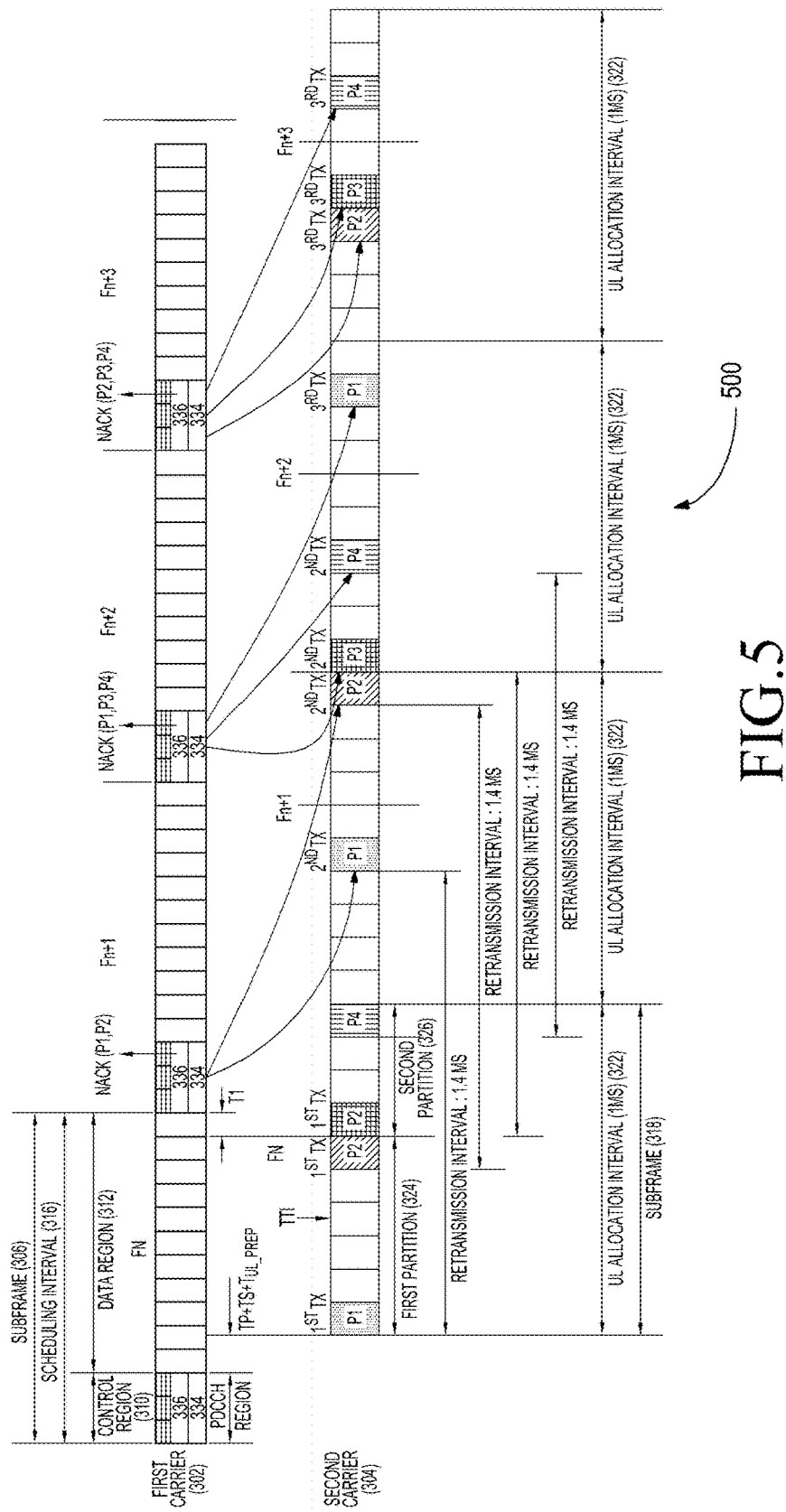
FIG. 5 is a schematic representation depicting an uplink HARQ operation, according to yet another embodiment.

FIG. 5 is a schematic representation 500 depicting an uplink HARQ operation, according to yet another embodiment. It can be seen that the schematic representation 500 of FIG. 5 is similar to the schematic representation 300 of FIG. 3, except that the uplink allocation interval 322 is partitioned into the first partition 324 comprising six TTIs and the second partition 326 comprising four TTIs. Since, the length of the second partition 326 is 0.4 milliseconds, the second retransmission interval is set to subframe duration plus length of the second partition 326 of the uplink allocation interval 322 (i.e., 1.4 milliseconds). Due to this, retransmission of the HARQ packet earlier transmitted in the first partition 324 of the uplink allocation interval 322 may fall into the second partition 326. For example, first HARQ packet transmission of a HARQ packet (P2) is started in a TTI of a first partition 324 in an uplink allocation interval 322. However, second HARQ packet transmission of the HARQ packet (P2) happens in a TTI corresponding to a second partition of a next uplink allocation interval 322. Also, it can be seen from FIG. 5 that, third HARQ packet transmission of the HARQ packet (P2) happens in a TTI corresponding to the first partition 324 in the uplink allocation interval 322.

Similarly, first HARQ packet transmission of a HARQ packet (P3) is started in a TTI of a second partition 326 in an uplink allocation interval 322. However, second HARQ packet transmission of the HARQ packet (P3) happens in a TTI corresponding to a first partition 324. Also, it can be seen from FIG. 5 that, third HARQ packet transmission of the HARQ packet (P3) happens in a TTI corresponding to the first partition 324.

Figure 6A:
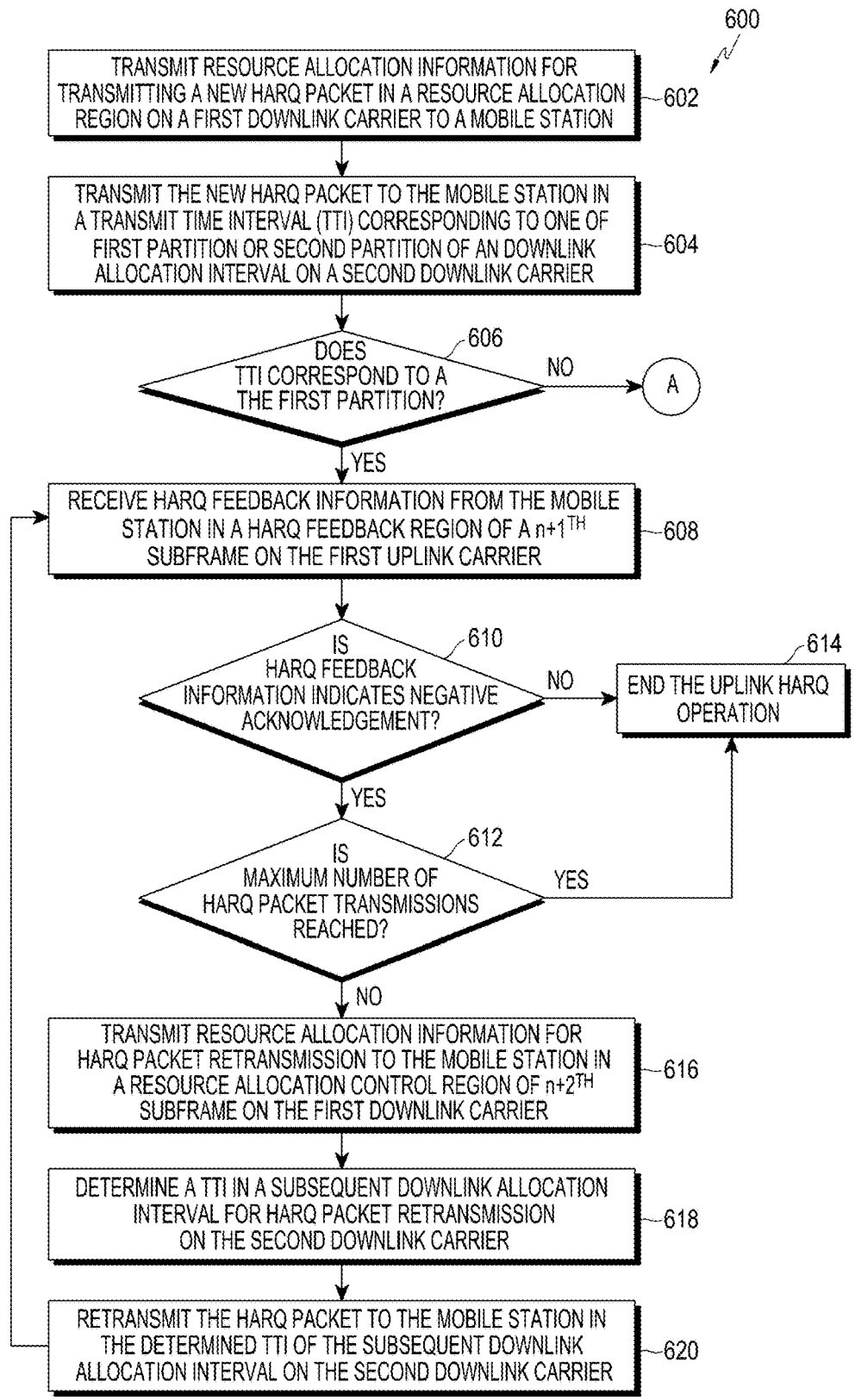
FIGS. 6A and 6B are a process flowchart illustrating an exemplary method of performing downlink HARQ operation in an asymmetric multicarrier communication network system, according to another embodiment.
Figure 6B:
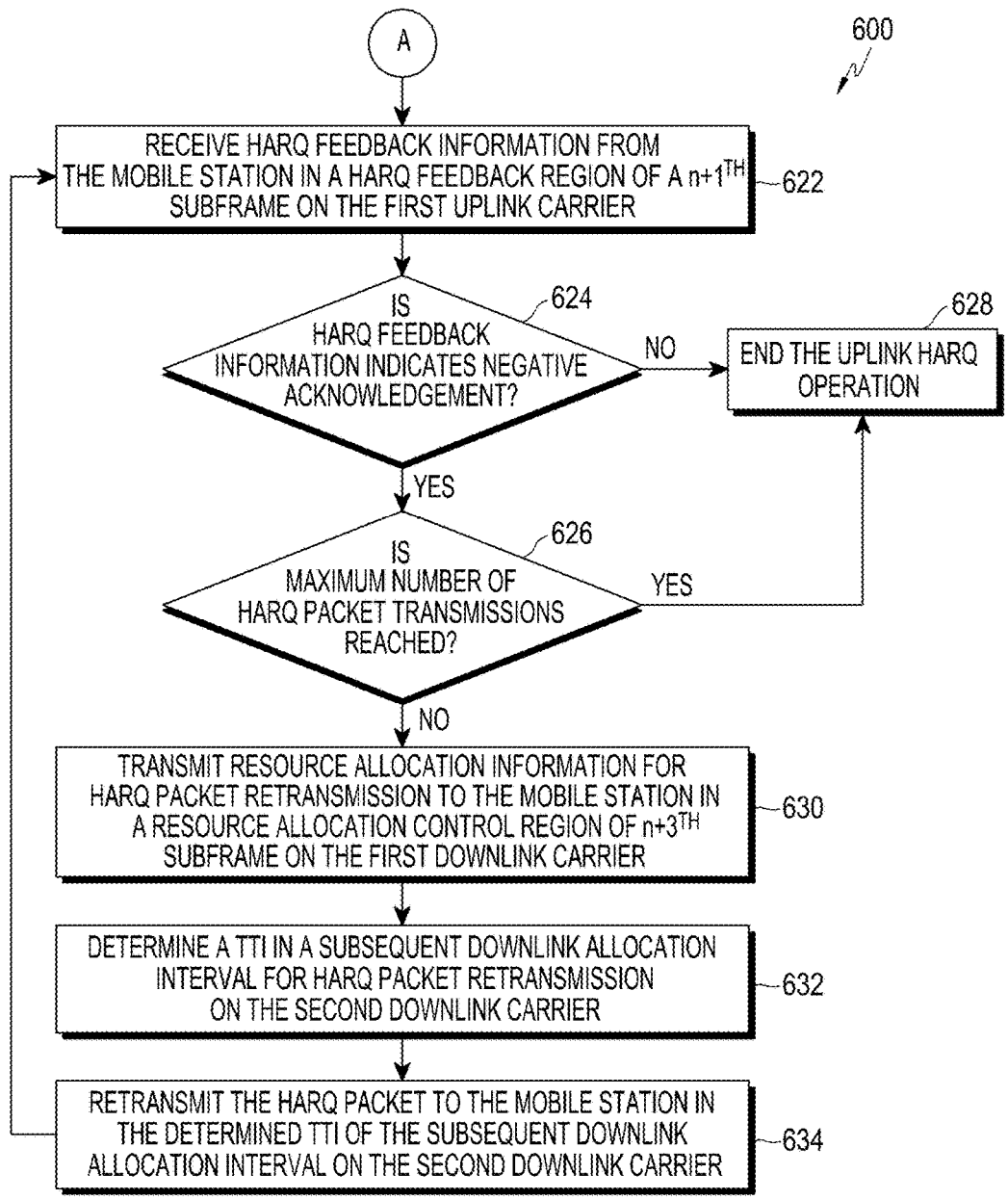

FIGS. 6A and 6B are a process flowchart 600 illustrating an exemplary method of performing downlink hybrid automatic repeat request (HARQ) operation in an asymmetric multicarrier communication network system 100, according to one embodiment. At step 602, resource allocation information for transmitting a new HARQ packet is transmitted to a mobile station (e.g., the mobile station 104) in a resource allocation region on a first downlink carrier (e.g., low frequency carrier based on Long Term Evolution Technology (LTE)). In some embodiments, the resource allocation information indicates resources (e.g., frequency and time resources), and a transmit time interval (TTI) in a downlink allocation interval of a second carrier (e.g., a high frequency carrier based on millimeter wave band) for transmitting a new HARQ packet on the second carrier.

At step 604, the new HARQ packet is transmitted to the mobile station 104 in a transmit time interval (TTI) corresponding to one of a first partition and a second partition of the downlink allocation interval on the second carrier based on the resource allocation information. For example, each downlink allocation interval is divided into two partitions, viz first partition and second partition. Timing of HARQ feedback, retransmission and resource allocation for HARQ packets corresponding to a HARQ process whose first HARQ packet transmission started in the first partition of the downlink allocation interval is based on a first type of HARQ process. Similarly, timing of HARQ feedback, retransmission and resource allocation for HARQ packets corresponding to a HARQ process whose first HARQ packet transmission started in the second partition of the downlink allocation interval is based on a second type of HARQ process. If the TTI belongs to the first partition, the HARQ packet is transmitted in the first partition of the downlink allocation interval. On the other hand, if the TTI belongs to the second partition, the HARQ packet is transmitted in the second partition of the downlink allocation interval.

At step 606, it is determined whether the TTI in which new HARQ packet is transmitted correspond to the first partition of the downlink allocation interval. If the transmit time interval corresponds to the first partition, then at step 608, HARQ feedback information is received from the mobile station 104 in a first HARQ feedback control region of a n+1$^{th}$ subframe on a first uplink carrier, where n is a subframe number corresponding to the downlink allocation interval in which the HARQ packet was transmitted at step 604 and the downlink allocation interval is aligned or is at a positive offset from the scheduling interval of the first carrier. Alternatively, at step 608, the HARQ feedback information is received from the mobile station 104 in a second HARQ feedback control region of a n$^{th}$ subframe on a first uplink carrier, wherein the downlink allocation interval of the second carrier is at a pre-determined negative offset from the scheduling interval of the first carrier. It is to be noted that two HARQ feedback control regions are present in each subframe of a first uplink carrier, each HARQ feedback control region span half subframe in time.

At step 610, it is determined whether the HARQ feedback information indicates negative acknowledgement of the HARQ packet transmitted in the downlink allocation interval. If the HARQ feedback information indicates negative acknowledgment, at step 612, it is determined whether maximum number of HARQ packet transmissions is reached. If the HARQ feedback information indicates positive acknowledgement or the maximum number of HARQ packet transmissions is reached, the downlink HARQ packet operation is ended, at step 614.

If the maximum number of HARQ packet transmissions is not reached, then at step 616, resource allocation information is transmitted to the mobile station 104 in a resource allocation control region of n+2$^{th}$ subframe on the first downlink carrier, where n is a subframe number corresponding to the downlink allocation interval in which the HARQ packet was transmitted at step 604. It can be noted that, the step 616 is optionally performed for synchronous downlink HARQ operation when the base station 102 allocates new resources or modifies the allocated resources for retransmitting the HARQ packet.

At step 618, earliest transmit time interval (TTI) for retransmission of the HARQ packet on the second carrier is determined. The location of TTI for retransmission of the HARQ packet is determined based on the partition in the downlink allocation interval in which the first HARQ packet transmission has occurred for the HARQ packet. Since, the HARQ packet corresponding to the first HARQ packet transmission is transmitted in the first partition of the downlink allocation interval, the TTI for the retransmission of the HARQ packet is located at a first retransmission interval from the TTI in which the HARQ packet corresponding to the previous HARQ packet transmission is transmitted. It is understood that, the previous HARQ packet transmission refers to HARQ packet transmission for which the HARQ feedback information is received. At step 620, the HARQ packet is retransmitted to the mobile station 104 in the determined TTI of the subsequent downlink allocation interval on the second carrier according to the resource allocation information. The steps 608 to 620 are repeated till the mobile station 104 successfully receives the HARQ packet (i.e., when the HARQ feedback information indicates positive acknowledgement) or the maximum number of HARQ packet transmissions is reached.

If, at step 606, it is determined that the transmit time interval corresponds to the second partition, then at step 622, HARQ feedback information is received from the mobile station 104 in a second HARQ feedback control region of a n+1$^{th}$ subframe on the first uplink carrier, where n is a subframe number corresponding to the downlink allocation interval in which the HARQ packet was transmitted at step 604. Alternatively, HARQ feedback information is received from the mobile station 104 in a first HARQ feedback control region of n+1$^{th}$ subframe on a first uplink carrier, wherein the downlink allocation interval of the second downlink carrier is at a pre-determined negative offset from the scheduling interval of the first downlink carrier. It is to be noted that two HARQ feedback control regions are present in each subframe of first uplink carrier, each HARQ feedback control region span half subframe in time.

At step 624, it is determined whether the HARQ feedback information indicates negative acknowledgement of the HARQ packet transmitted in the downlink allocation interval. If the HARQ feedback information indicates negative acknowledgment, at step 626, it is determined whether maximum number of HARQ packet transmissions is reached. If the HARQ feedback information indicates positive acknowledgement or the maximum number of HARQ packet transmissions is reached, the downlink HARQ packet operation ends at step 628.

If the maximum number of HARQ packet transmissions is not reached, then at step 630, resource allocation information is transmitted to the mobile station 104 in a resource allocation control region of n+3$^{th}$ subframe on the first downlink carrier, where n is a subframe number corresponding to the downlink allocation interval in which the HARQ packet was transmitted at step 604. It can be noted that, the step 630 is optionally performed when the base station 102 allocates new resources or modifies the allocated resources for retransmitting the HARQ packet.

At step 632, earliest transmit time interval (TTI) for retransmission of the HARQ packet on the second carrier is determined. The location of TTI for retransmission of the HARQ packet is determined based on the partition in the downlink allocation interval in which the first HARQ packet transmission has occurred for the HARQ packet. Since, the HARQ packet corresponding to the first HARQ packet transmission is transmitted in the second partition of the downlink allocation interval, the TTI for the retransmission of the HARQ packet is located at a second retransmission interval from the TTI in which the HARQ packet corresponding to the previous HARQ packet transmission is transmitted. It is understood that, the previous HARQ packet transmission refers to HARQ packet transmission for which the HARQ feedback information is received. At step 634, the HARQ packet is retransmitted to the mobile station 104 in the determined TTI of the subsequent downlink allocation interval on the second carrier according to the resource allocation information. The steps 622 to 634 are repeated till the mobile station 104 successfully receives the HARQ packet (i.e., when the HARQ feedback information indicates positive acknowledgement) or the maximum number of HARQ packet transmissions is reached.

Figure 7:
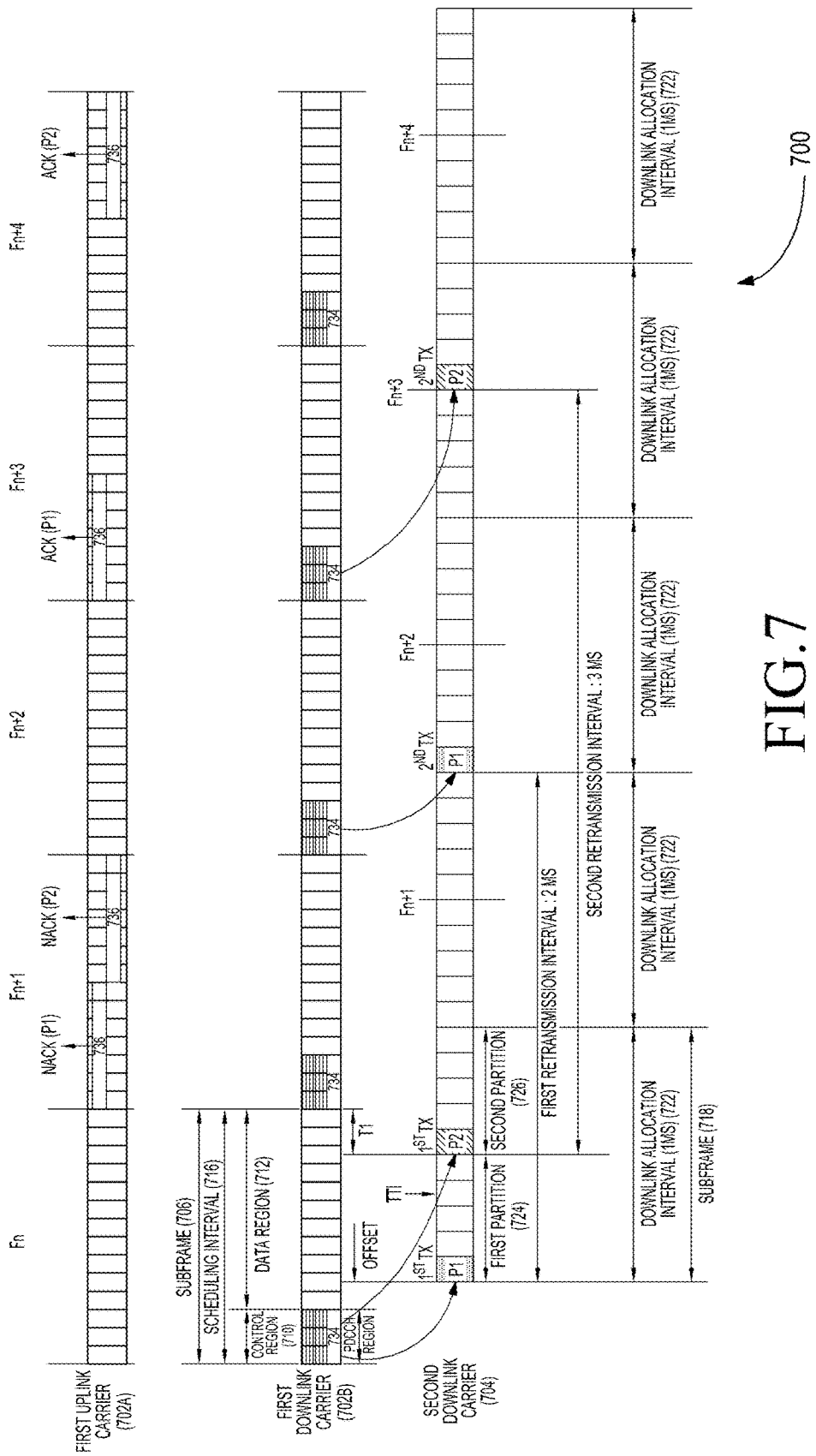
FIG. 7 is schematic representation depicting a downlink HARQ operation, according to one embodiment.

FIG. 7 is schematic representation 700 depicting a downlink HARQ operation, according to one embodiment. Particularly, FIG. 7 illustrates a schematic representation of a first uplink carrier 702A, a first downlink carrier 702B, and a second downlink carrier 704. The first uplink carrier 702A and the first downlink carrier 702B may be a low frequency carrier and the second downlink carrier 704 may be a high frequency carrier. In an exemplary implementation, the first uplink carrier 702A and the first downlink carrier 702B may be a primary carrier and the second downlink carrier 704 may be a secondary carrier. In another exemplary implementation, the first uplink carrier 702A and the first downlink carrier 702B may be a first secondary carrier and the second downlink carrier 704 may be a second secondary carrier. It can be seen that from FIG. 7 that, the second downlink carrier 704 is asymmetric carrier with respect to the first uplink carrier 702A and the first downlink carrier 702B.

Each subframe 706 is associated with the first downlink carrier 702B includes a control region 710 and a data region 712. For example, each subframe 706 is 1 ms in size and is divided into ten slots 714, each slots is of 0.1 ms size. A scheduling interval 716 of the first downlink carrier 702B spans an entire subframe 706. The control region 710 includes a resource allocation control region 734 for the first downlink carrier 702B. The first uplink carrier 702B includes a HARQ feedback region 736 as shown in FIG. 7. The HARQ feedback region 736 is divided into two partitions, viz a first partition and a second partition.

Each subframe 718 associated with the second downlink carrier 704 corresponds to a downlink allocation interval 722. A downlink allocation interval 722 in the second downlink carrier 704 is aligned with boundary of the subframe 718 in the second downlink carrier 704. However, the downlink allocation interval 722 can be offset from the boundary of the subframe 718 in the second downlink carrier 704. The downlink allocation interval 722 is a time duration for which the resource allocation control region 734 of the subframe 706 on the first carrier 702 indicates resources allocated for transmission of HARQ packets in downlink direction on the second downlink carrier 704. Further, the downlink allocation interval 722 is at an offset from the start boundary of the subframe 706. The offset is equal to at least the time required to process resource allocation information received in resource allocation region 734 of the scheduling interval 716 of the first carrier 702.

The downlink allocation interval 722 consists of multiple TTIs (e.g., 10 TTIs). Each TTI carries one HARQ process, where each HARQ process carries one HARQ packet. That is, multiple HARQ processes are time division multiplexed in each downlink allocation interval 722. Multiple HARQ processes may be frequency division multiplexed in one TTI in addition to time division multiplexing of HARQ processes in each downlink allocation interval 722.

In the present disclosure, two types of HARQ processes (i.e., first type of HARQ process and second type of HARQ process) are defined for downlink HARQ operation on the second downlink carrier 704. According to the embodiment illustrated in FIG. 7, a first retransmission interval associated with the first type of HARQ process is different than a second retransmission interval associated with the second type of HARQ process. As depicted in FIG. 7, the first retransmission interval is of 2 milliseconds and the second retransmission interval is of 3 milliseconds. In case of asynchronous transmission, retransmission interval referred herein is a minimum retransmission interval.

The downlink allocation interval 722 is divided into a first partition 724 and a second partition 726. The first partition 724 includes a first set of contiguous transmit time intervals (TTIs) which corresponds to first type of HARQ process and the second partition 726 includes a second set of contiguous transmit time intervals (TTIs) which correspond to second type of HARQ process. For example, the first set of contiguous TTIs contains five TTIs and the second set of TTIs contains five TTIs. The size of the first partition of the downlink allocation interval 722 is equal to number of TTIs in the downlink allocation interval 722 minus the pre-determined offset (T1) minus the offset minus time duration ($T_{PDCCH}$) of the resource allocation control region 734, where the offset is the time duration between the start of the downlink allocation interval 722 from the end of the control region 710 in the first downlink carrier 702B. In one exemplary implementation, the value of T1+offset+$T_{PDCCH}$ is quantized to TTI boundary. For example, if the downlink allocation interval 722 consists of ten TTIs, the size of the first partition 724 is equal to 10−(T1+offset+$T_{PDCCH}$)=5 slots TTIs and size of the second partition 726 is equal to T1+offset+$T_{PDCCH}$=5 TTIs.

Both the first partition 724 and the second partition 726 start at TTI boundary of the downlink allocation interval 722. The downlink allocation interval 722 is divided into a first partition 724 and a second partition 726. The first partition 724 includes a first set of contiguous transmit time intervals (TTIs) and the second partition 726 includes a second set of contiguous transmit time intervals (TTIs). The first TTI in the first set of contiguous TTIs starts at the beginning of the downlink allocation interval. The first TTI in the second set of contiguous TTIs is a TTI in the downlink allocation interval 722 which is at a pre-determined offset (T1) from the resource allocation control region 734 in a next scheduling interval 716 of the first downlink carrier 702B. The pre-determined offset (T1) is equal to at least time required to process a HARQ packet and time required to prepare HARQ feedback information. The pre-determined offset (T1) may also include time corresponding to timing advance. It can be noted that, maximum timing advance supported by the asymmetric multicarrier communication network system 100 may be considered to compute the pre-determined offset. The pre-determined offset (T1) is quantized to a TTI boundary.

As shown in FIG. 7, the base station 102 transmits resource allocation information to the mobile station 104 in the resource allocation control region 710 in the scheduling interval 716 on the first downlink carrier 702B. For example, the base station 102 transmits an S-PDCCH carrying the resource allocation information in a PDCCH region of the subframe 706 on the first carrier 702. The resource allocation information indicates resources and TTI in the downlink allocation interval 722 for receiving a HARQ packet on the second downlink carrier 704 by the mobile station 104. The TTI indicated in the resource allocation information corresponds to one of the first partition 724 and the second partition 726 of the downlink allocation interval 722.

Consider that, the TTI corresponds to the first partition 724 of the downlink allocation interval 722. As shown in FIG. 7, the base station 102 transmits a HARQ packet (P1) corresponding to a first HARQ packet transmission ($1^{st}$Tx) to the mobile station 104 in the TTI of the first partition 724 of the downlink allocation interval 722 according to a first type of HARQ process (Type A). However, if the TTI corresponds to the second partition 726 of the downlink allocation interval 722, the base station 102 transmits a HARQ packet (P2) corresponding to a first HARQ packet transmission ($1^{st}$Tx) to the mobile station 104 in the TTI of the second partition 726 of the downlink allocation interval 722 according to a second type of HARQ process (Type B).

For the first type of HARQ process, consider that the mobile station 104 have not received the HARQ packet (P1) transmitted by the base station 102 in the TTI of the first partition 724 of the downlink allocation interval 722. As shown in FIG. 7, the mobile station 104 transmits HARQ feedback information in a Physical Uplink Control Channel (PUCCH) to the base station 102 in the first partition of the HARQ feedback region 736 of the next subframe 706 (Fn+1) on the first uplink carrier 702A. Consider that, the HARQ feedback information indicates negative acknowledgement (NACK) of the first HARQ packet transmission ($1^{st}$Tx) in the TTI of the first partition 724.

For the second type of HARQ process, consider that the mobile station 104 have also not received the HARQ packet (P2) transmitted by the base station 102 in the TTI of the second partition 726 of the downlink allocation interval 722. As shown in FIG. 7, the mobile station 104 transmits HARQ feedback information in a PUCCH to the base station 102 in the second partition of the HARQ feedback region 736 of the next subframe 706 (Fn+1) on the first uplink carrier 702A. Consider that, the HARQ feedback information indicates negative acknowledgement (NACK) of the first HARQ packet transmission ($1^{st}$Tx) in the TTI of the second partition 726.

For first type of HARQ process, as AHARHARQ the HARQ feedback information indicates negative acknowledgement (NACK) of the HARQ packet (P1) transmitted in the first partition 724, the base station 102 determines earliest TTI for performing a second HARQ packet transmission ($2^{nd}$Tx) based on the partition of the downlink allocation interval 722 in which the HARQ packet corresponding to the first HARQ packet transmission ($1^{st}$Tx) was transmitted. The TTI is located at a first retransmission interval from the TTI corresponding to the first HARQ packet transmission ($1^{st}$Tx). Since, the first retransmission interval is 2 milliseconds, the earliest TTI would be first TTI of a first partition 724 of downlink allocation interval 722 of the subframe Fn+2 of the second downlink carrier 704. Accordingly, the base station 102 transmits the HARQ packet (P1) corresponding to the second HARQ packet transmission ($2^{nd}$Tx) in the first TTI of the first partition 724 in the downlink allocation interval 722 of the subframe Fn+2 on the second downlink carrier 704 based on the resources allocated after the reception of the HARQ feedback information corresponding to the first HARQ packet transmission (1$^{st}$Tx). The base station 102 transmits the second packet HARQ transmission (2$^{nd}$Tx) after allocating and transmitting the resources for the second HARQ packet transmission (2$^{nd}$Tx) in the control region 710 of the subframe Fn+2 on the first downlink carrier 702B.

For second type of HARQ process, as AHARHARQ the HARQ feedback information indicates negative acknowledgement (NACK) of the HARQ packet (P2) transmitted in the first partition 724, the base station 102 performs a second HARQ packet transmission (2$^{nd}$Tx), as shown in FIG. 7. The base station 102 determines earliest TTI for performing a second HARQ packet transmission (2$^{nd}$Tx) based on the partition of the downlink allocation interval 722 in which the HARQ packet corresponding to the first HARQ packet transmission (1$^{st}$Tx) was transmitted. The TTI is located at a second retransmission interval from the TTI corresponding to the first HARQ packet transmission (1$^{st}$Tx). Since, the second retransmission interval is 3 milliseconds, the earliest TTI would be first TTI of a second partition 726 of downlink allocation interval 722 in the subframe Fn+3 of the second downlink carrier 704. Accordingly, the base station 102 transmits the HARQ packet (P2) corresponding to a second HARQ packet transmission (2$^{nd}$Tx) to the mobile station 104 in the first TTI of the second partition 726 of the downlink allocation interval 722 in the subframe Fn+3 on the second downlink carrier 704. The base station 102 allocates resources for the second HARQ packet transmission (2$^{nd}$Tx) after receiving and processing the HARQ feedback information for the first HARQ packet transmission (1$^{st}$Tx). The base station 102 transmits the HARQ packet corresponding to the second HARQ packet transmission (2$^{nd}$Tx) after transmitting the resource allocation information for the second HARQ packet transmission (2$^{nd}$Tx) in the control region 710 of the subframe Fn+3 on the first downlink carrier 702B.

It can be seen from FIG. 7 that, TTI for subsequent HARQ packet transmissions of the HARQ packet which was first transmitted in the first partition 724 of the downlink allocation interval 722 is always one of the TTIs in the first partition 724 of the downlink allocation interval 722. Similarly, TTI for subsequent HARQ packet transmissions of the HARQ packet which first transmitted in the second partition 726 of the downlink allocation interval 722 is always one of the TTIs in the second partition 726 of the downlink allocation interval 722. In the above cases, retransmission interval for a HARQ process started in the first partition 724 of the downlink allocation interval 722 is equal to twice the subframe duration (i.e., 2 milliseconds) while retransmission interval for a HARQ process started in the second partition 726 of the downlink allocation interval 722 is equal to thrice the subframe duration (i.e., 3 milliseconds).

Figure 8:
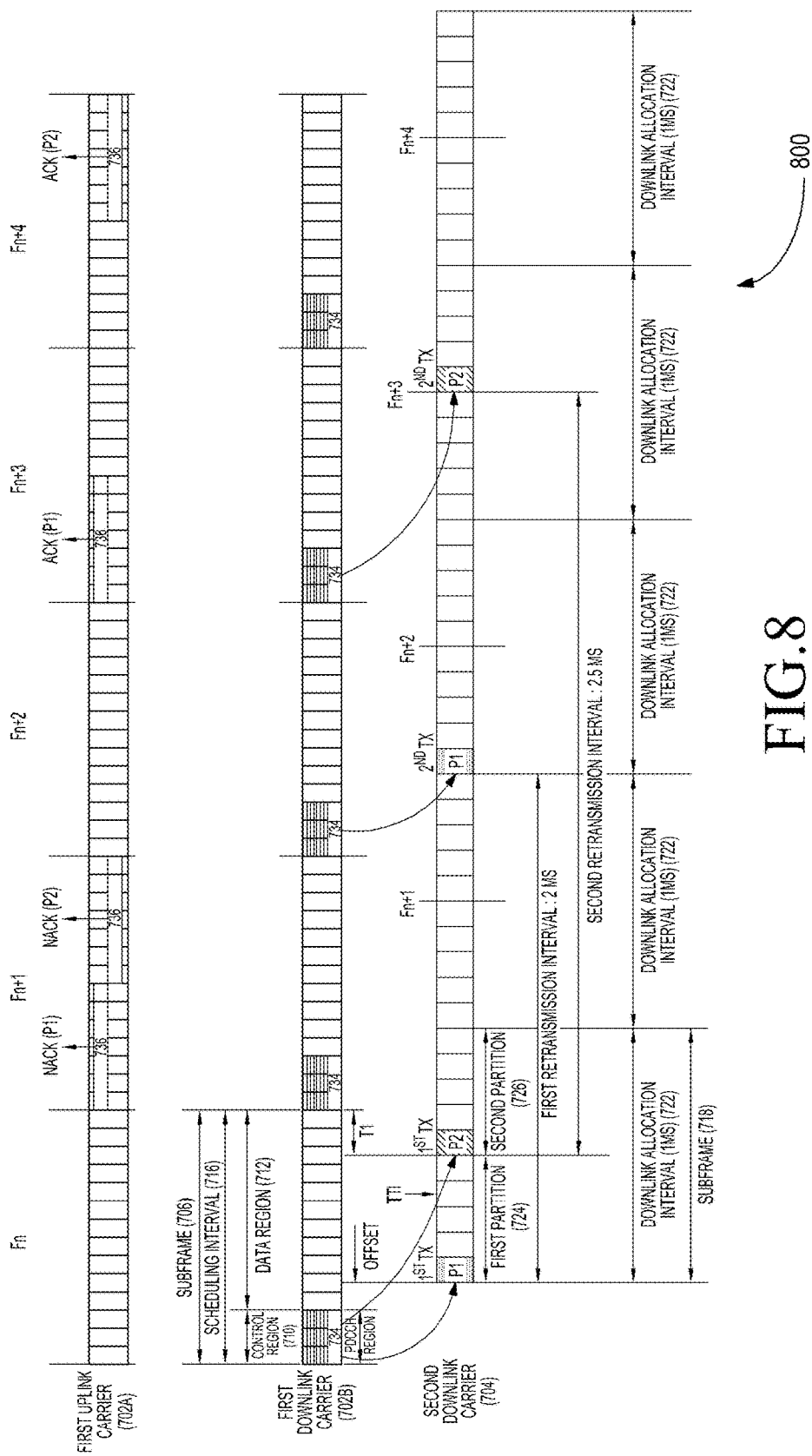
FIG. 8 is a schematic representation depicting a downlink HARQ operation, according to another embodiment.

FIG. 8 is a schematic representation 800 depicting a downlink HARQ operation, according to another embodiment. It can be seen that the schematic representation 800 of FIG. 8 is similar to the schematic representation 700 of FIG. 7, except the value of the second retransmission interval associated with the second type of HARQ process. The minimum value of the first retransmission interval for asynchronous downlink HARQ operation may range from 1 millisecond+T1+Offset+$T_{PDCCH}$ to 2 milliseconds and minimum value of the second retransmission interval for asynchronous downlink HARQ operation may range from 2 milliseconds+1TTI to 2 milliseconds+T1+offset+$T_{PDCCH}$.

Similarly, for synchronous downlink HARQ operation, the value of the first retransmission interval is 2 milliseconds while the value of the second retransmission interval is 2 milliseconds+T1+offset+$T_{PDCCH}$.

It can be seen from FIG. 8 that, TTI for subsequent HARQ packet transmissions of the HARQ packet which first transmitted in the first partition 724 of the downlink allocation interval 722 is always one of the TTIs in the first partition 724 of the downlink allocation interval 722 o, whereas TTI for subsequent HARQ packet transmissions of the HARQ packet which of the subframe Fn+2, first transmitted in the second partition 726 of the downlink allocation interval 722 is always one of the TTIs in the first partition 724 or the second partition 726 of the downlink allocation interval 722 of the subframe Fn+3. In FIG. 8, since the second retransmission interval is equal to 2.5 milliseconds, TTI for HARQ packet transmission which started in the second partition 726 of the downlink allocation interval 722 may be a TTI of a first partition 724 or a second partition 726 of the downlink allocation interval 722 during subsequent retransmission of the HARQ packet.

Figure 9:
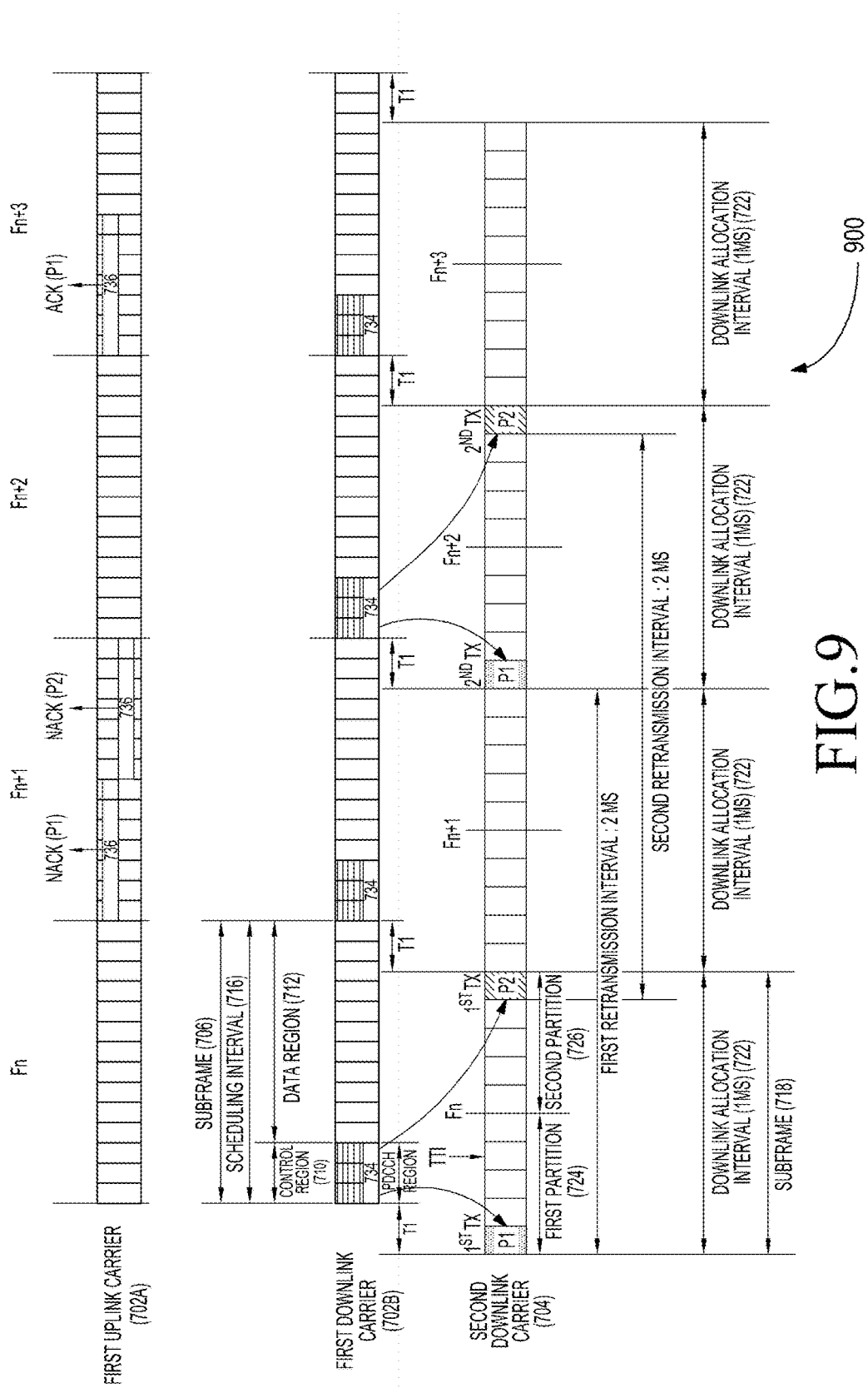
FIG. 9 is a schematic representation depicting a downlink HARQ operation, according to yet another embodiment.

FIG. 9 is a schematic representation 900 depicting a downlink HARQ operation, according to yet another embodiment. In FIG. 9, the downlink allocation interval 722 in the second downlink carrier 704 is negatively offset 'T1' to start of a subframe of the first downlink carrier 702B. The offset 'T1' is equal to time required to process a HARQ packet plus time required to prepare HARQ feedback information. The offset 'T1' may also include time corresponding to timing advance. It can be noted that, maximum timing advance supported by the asymmetric multicarrier communication network system 100 may be considered to compute the offset 'T1'. The offset 'T1' is quantized to a TTI boundary.

In some embodiments, HARQ processes for all TTIs may have same retransmission interval (i.e., 2 milliseconds) in case of synchronous downlink HARQ operation and same minimum retransmission interval (e.g., 2 milliseconds) in case of asynchronous downlink HARQ operation. In FIG. 9, the retransmission interval is equal to twice the subframe duration for synchronous HARQ operation. For asynchronous HARQ operation, the minimum retransmission interval is equal to twice the subframe duration.

As can be seen from FIG. 9, the base station 102 transmits a HARQ packet (P1) prior to transmission of associated resource allocation information in the resource allocation region 734 of the first downlink carrier 702B. The resources for the HARQ packets can be adapted in the resource allocation control region 734 in the subframe Fn+2. The mobile station 104 transmits HARQ feedback information for the HARQ packets corresponding to HARQ processes received in a subframe in first partition if the HARQ feedback control region 736 of the subsequent subframe. The HARQ feedback region 736 carrying the HARQ feedback information for the HARQ packets transmitted in the downlink allocation interval 722 whose resources are indicated by the resource allocation control region 734 of the subframe 'Fn' in the first downlink carrier is a HARQ feedback control region in a first TTI of a subframe 'Fn+1' of the first uplink carrier 702A.

Figure 10:
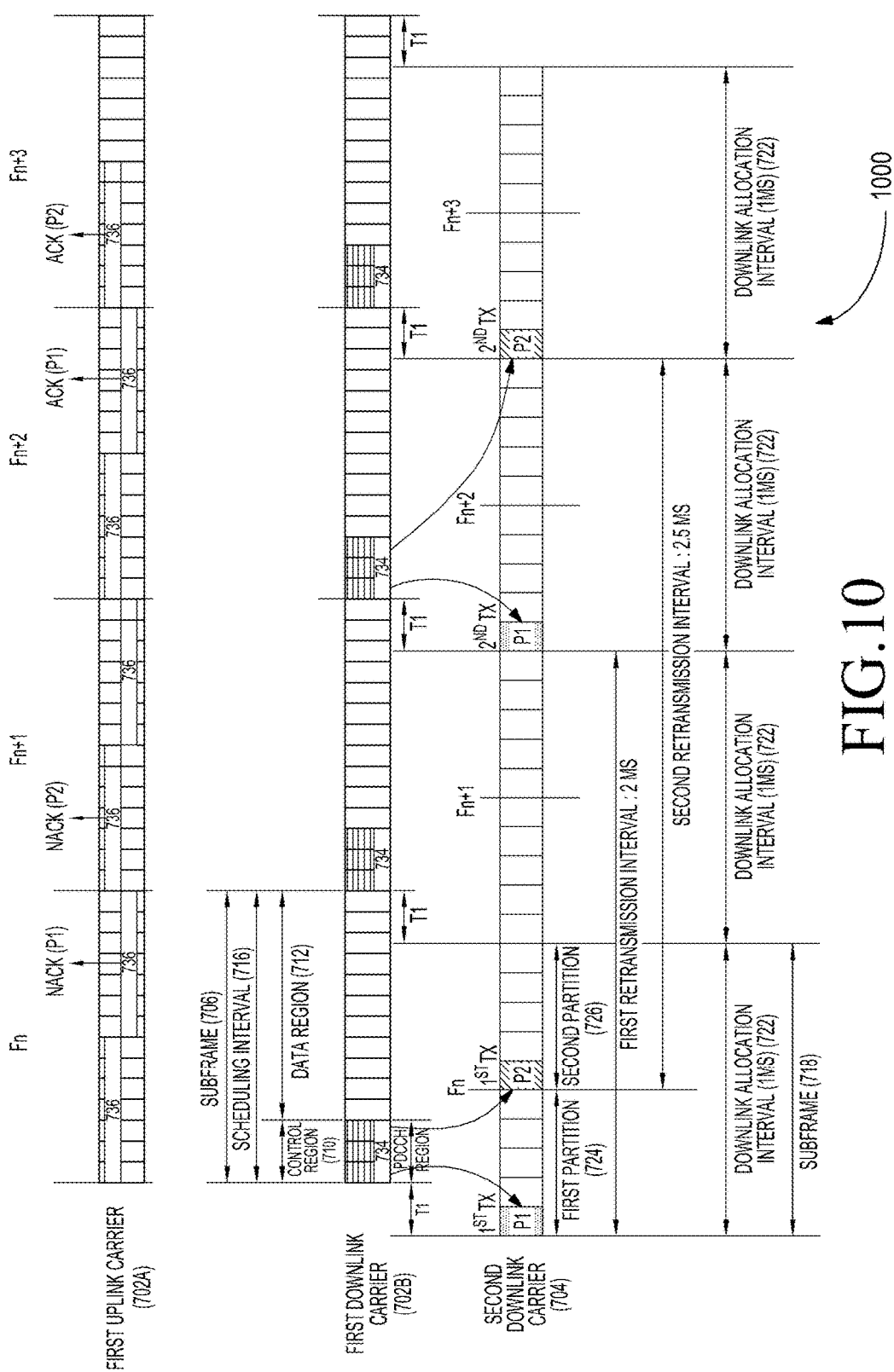
FIG. 10 is a schematic representation depicting a downlink HARQ operation, according to further another embodiment.

FIG. 10 is a schematic representation 1000 depicting a downlink HARQ operation, according to further another embodiment. It can be seen that the schematic representation 1000 of FIG. 10 is similar to the schematic representation 900 of FIG. 9 except that the downlink allocation interval 722 is divided into a first partition 724 and a second partition 726. Hence, the HARQ feedback region 734 in which the HARQ feedback information is transmitted depends on the partition of the downlink allocation interval 722 in which the HARQ packet was transmitted. For example, HARQ feedback information for a HARQ packet (P1) received in the first partition 724 of the downlink allocation interval 722 is transmitted in the second partition of the HARQ feedback control region 736B of the same subframe (Fn). Similarly, HARQ feedback information for a HARQ packet (P2) received in the second partition 726 of the downlink allocation interval 722 is transmitted in the first partition of the HARQ feedback control region 736 of the subsequent subframe (Fn+1).

One skilled in the art will understand that various embodiments described in FIGS. 1A to 10 are equally applicable to extended Super Mobile Broadband (SMB) TDD carrier operation, wherein HARQ control information is transmitted on a first carrier (e.g., Frequency Division Duplex (FDD) Long Term Evolution (LTE)) and data packets are transmitted on a second carrier (i.e., TDD SMB). It is to be noted that if the length of the downlink portion of TDD SMB sub frame is less than LTE sub frame duration minus T1 minus the time duration of control region, then the first type of downlink HARQ process is applicable. The length of the uplink portion of the TDD SMB subframe should be configured to be greater than or equal to T1, else only second type of HARQ process is applicable. The length of the downlink portion of the TDD SMB subframe should be greater than or equal to the time duration of the control region plus the time required to prepare an uplink packet else the TDD SMB subframe shall be configured at a positive offset to the LTE DL subframe by an amount that is at least the time duration of the control region plus the time required to prepare an uplink packet minus the length of the downlink portion of the TDD SMB subframe.

Figure 11:
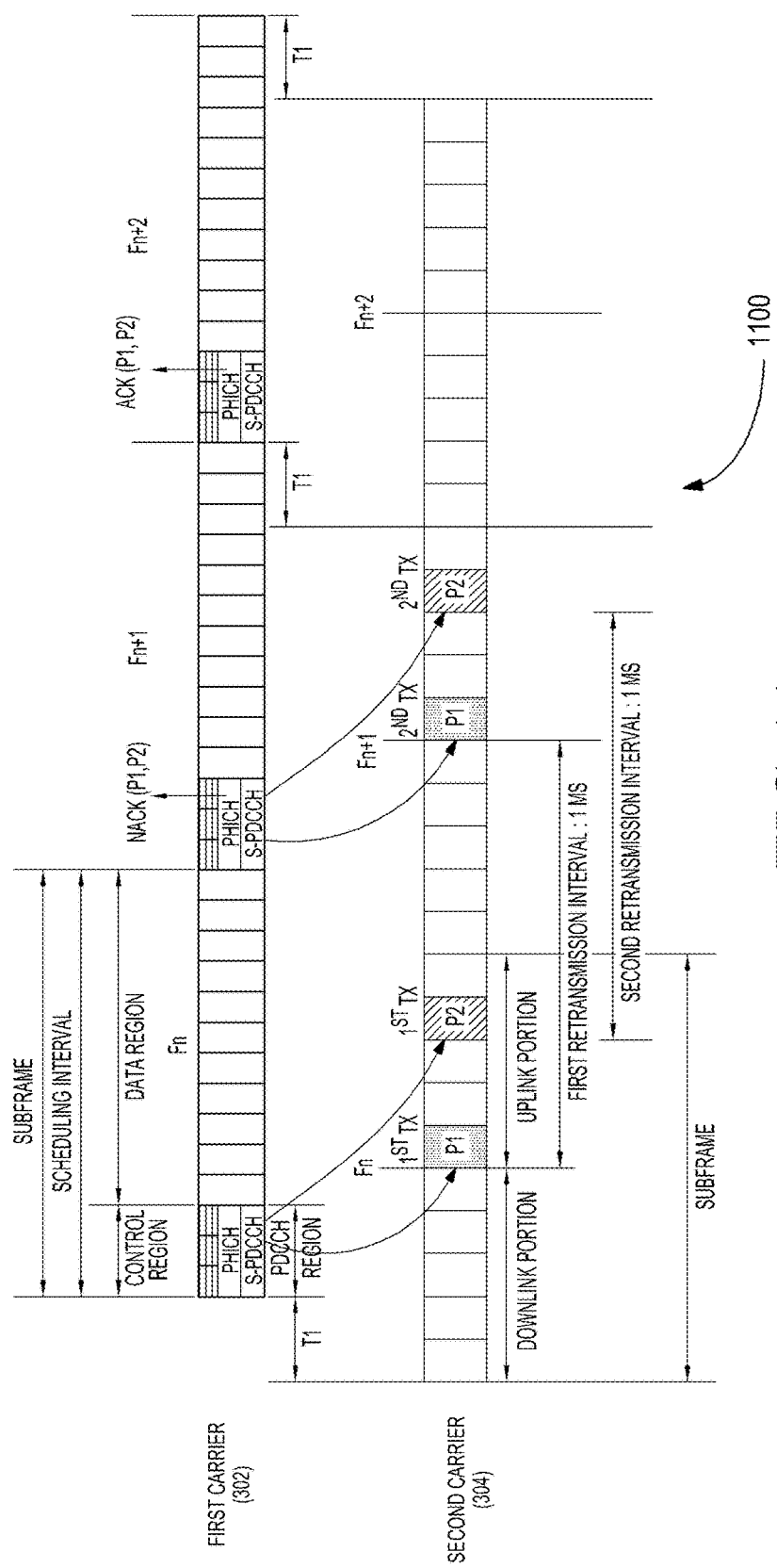
FIG. 11 is a schematic representation illustration a Time Division Duplex (TDD) uplink HARQ operation, according to one embodiment.

FIG. 11 is a schematic representation 1100 illustrating a Time Division Duplex (TDD) uplink HARQ operation, according to one embodiment. The scenario depicted in FIG. 11 is applicable to extended SMB TDD carrier operation, wherein HARQ control information is sent on a first carrier (FDD LTE) and HARQ packets are sent on a second carrier (TDD SMB carrier). In FIG. 11, a downlink allocation interval in the second carrier is negatively offset with respect to a subframe of the first carrier by a value 'T1'. The offset 'T1' is equal to time required to process a HARQ packet plus time required to prepare HARQ feedback information. The offset 'T1' may also include time corresponding to timing advance. It can be noted that, maximum timing advance supported by the asymmetric multicarrier communication network system 100 may be considered to compute the offset 'T1'. The offset 'T1' is quantized to a TTI boundary. In some embodiments, HARQ processes for all TTIs may have same retransmission interval (i.e., 2 milliseconds) in case of synchronous downlink HARQ operation and same minimum retransmission interval (e.g., 2 milliseconds) in case of asynchronous downlink HARQ operation. In the embodiment illustrated in FIG. 11, the length of the downlink portion of the TDD SMB sub frame is configured to be greater than or equal to T1 plus the time duration of control region plus the time required to prepare uplink packet.

Figure 12:
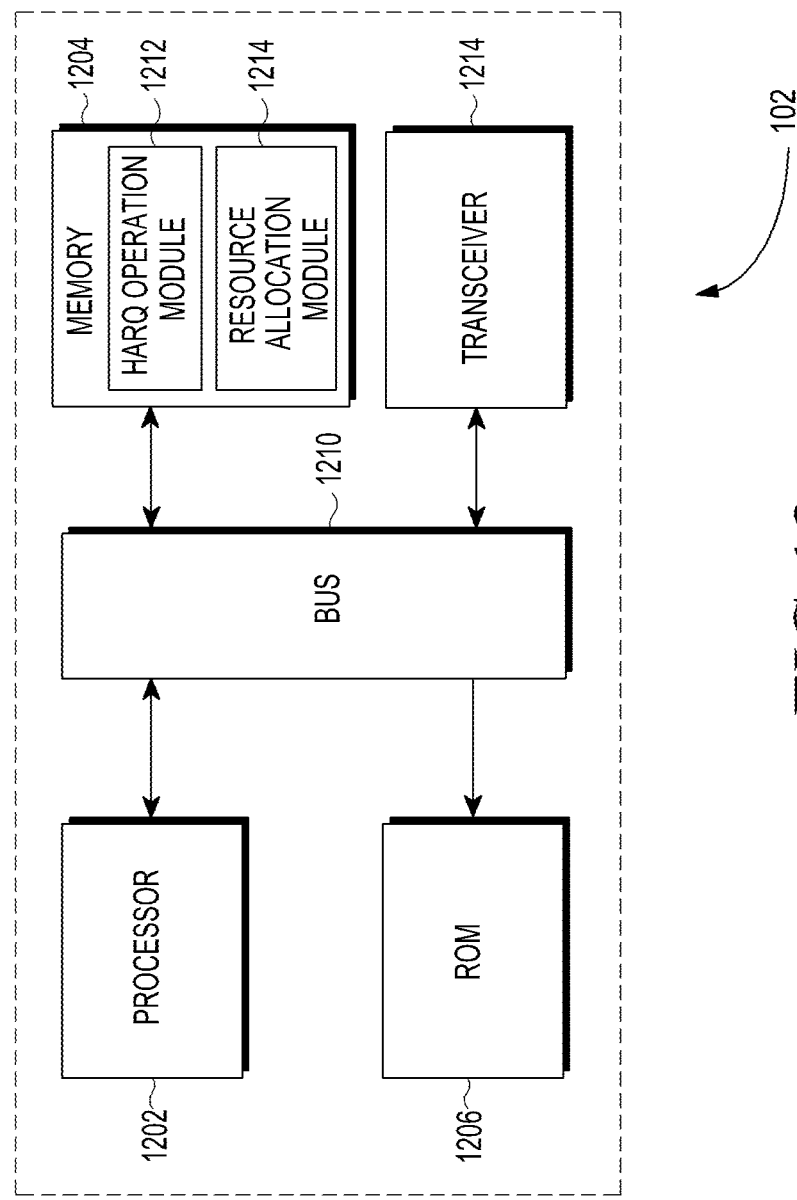
FIG. 12 is a block diagram of a base station, such as those shown in FIG. 1a and FIG. 1b, showing various components for implementing embodiments of the present subject matter.

FIG. 12 is a block diagram of the base station 102 showing various components for implementing embodiments of the present subject matter. In FIG. 12, the base station 102 includes a processor 1202, a memory 1204, a read only memory (ROM) 1206, a transceiver 1208, and a bus 1210.

The processor 1202, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1202 may also include embedded controllers, such as generic or programmable logic devices or arrays, application specific integrated circuits, single-chip computers, smart cards, and the like.

The memory 1204 and the ROM 1206 may be volatile memory and non-volatile memory. The memory 1204 includes a HARQ operation module 1212 for transmitting HARQ packets and receiving HARQ feedback information or receiving HARQ packets and transmitting HARQ feedback, and a resource allocation module 1214 for allocating resources and TTIs for transmission of the HARQ packets, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. Although, the memory 1204 containing the HARQ operation module 1212 and the resource allocation module 1214 is shown as a separate entity, one skilled in the art may understand that in some implementations, the memory 1204 containing the HARQ operation module 1212 and the resource allocation module 1214 may be a part of the processor 1202.

Embodiments of the present subject matter may be implemented in conjunction with modules, including functions, procedures, data structures, and application programs, for performing tasks, or defining abstract data types or low-level hardware contexts. The HARQ operation module 1212 and the resource allocation module 1214 may be stored in the form of machine-readable instructions on any of the above-mentioned storage media and may be executed by the processor 1202. For example, a computer program may include machine-readable instructions which when executed by the processor 1202, may cause the processor 1202 to transmit HARQ packets and receive HARQ feedback information or to receive HARQ packets and transmit HARQ feedback information and to allocate resources and TTIs for transmission of the HARQ packets, according to the teachings and herein described embodiments of the present subject matter. In one embodiment, the program may be included on a compact disk-read only memory (CD-ROM) and loaded from the CD-ROM to a hard drive in the non-volatile memory.

The transceiver 1208 may be capable of transmitting resource allocation information, transmitting/receiving HARQ packets and HARQ feedback information. The bus 1210 acts as interconnect between various components of the base station 102.

Figure 13:
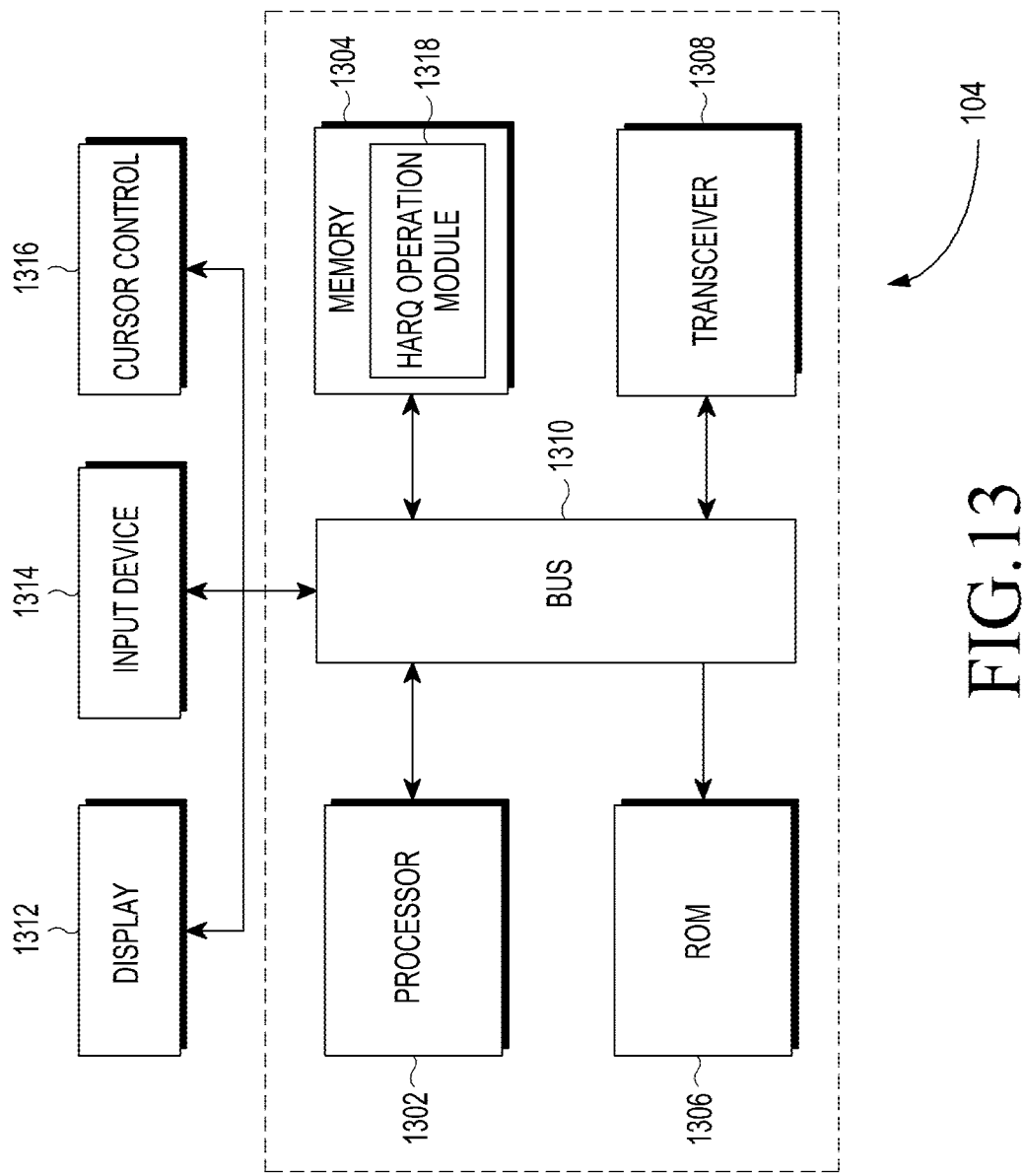
FIG. 13 is a block diagram of a mobile station, such as those shown in FIG. 1a and FIG. 1b, showing various components for implementing embodiments of the present subject matter.

FIG. 13 is a block diagram of a mobile station 104 showing various components for implementing embodiments of the present subject matter. In FIG. 13, the mobile station 104 includes a processor 1302, memory 1304, a read only memory (ROM) 1306, a transceiver 1308, a bus 1310, a display 1312, an input device 1314, and a cursor control 1316.

The processor 1302, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1302 may also include embedded controllers, such as generic or programmable logic devices or arrays, application specific integrated circuits, single-chip computers, smart cards, and the like.

The memory 1304 and the ROM 1306 may be volatile memory and non-volatile memory. The memory 1304 includes a HARQ operation module 1318 for transmitting HARQ packets and receiving HARQ feedback information according to uplink HARQ processes, for receiving HARQ packets and transmitting HARQ feedback information according to downlink HARQ processes, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. Although, the memory 1304 containing the HARQ operation module 1318 is shown as a separate entity, one skilled in the art may understand that in some implementations, the memory 1304 containing the HARQ operation module 1318 may be a part of the processor 1302.

Embodiments of the present subject matter may be implemented in conjunction with modules, including functions, procedures, data structures, and application programs, for performing tasks, or defining abstract data types or low-level hardware contexts. The HARQ operation module 1318 may be stored in the form of machine-readable instructions on any of the above-mentioned storage media and may be executed by the processor 1302. For example, a computer program may include machine-readable instructions, that when executed by the processor 1302, cause the processor 1302 to transmit HARQ packet and receive HARQ feedback information according to uplink HARQ processes or to receive HARQ packets and transmit HARQ feedback information according to downlink HARQ processes, according to the teachings and herein described embodiments of the present subject matter. In one embodiment, the computer program may be included on a compact disk-read only memory (CD-ROM) and loaded from the CD-ROM to a hard drive in the non-volatile memory.

The transceiver 1308 may be capable of transmitting/receiving HARQ packet and HARQ feedback information to/from the base station 102. The bus 1310 acts as interconnect between various components of the mobile station 104. The components such as the display 1312, the input device 1314, and the cursor control 1316 are well known to the person skilled in the art and hence the explanation is thereof omitted.

The present disclosure can be implemented with hardware, software, or combination thereof. In hardware implementation, the present disclosure can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present disclosure can be implemented with a module (e.g., HARQ operation module 1212 and HARQ operation module 1318) for performing the aforementioned functions. Software is storable in a memory unit and executed by the processor. Various means widely known to those skilled in the art can be used as the memory unit or the processor.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of a mobile station in a multicarrier communication system, the method comprising:
   receiving control information on a first carrier;
   transmitting a packet in a first time interval on a second carrier based on the control information;
   receiving feedback information corresponding to the packet on the first carrier; and
   retransmitting the packet in a second time interval having a time duration equal to a time duration of the first time interval, on the second carrier based on the feedback information,
   wherein the time duration of the first time interval includes one of a first duration and a second duration longer than the first duration based on the control information, and
   wherein a first start time is different from a second start time, the first start time represents a start time of the first time interval if the time duration of the first time interval includes the first duration, and the second start time represents the start time of the first time interval if the time duration of the first time interval includes the second duration.

2. The method of claim 1, wherein the control information includes information about a start time and the time duration of the first time interval.

3. The method of claim 1, wherein the first start time and the second start time are corresponded to a start position of each of partitions determined by dividing a firstly allocated uplink subframe.

4. The method of claim 1, wherein a start time of a second uplink time interval is a time after the time duration of the first time interval.

5. A method of a base station in a multicarrier communication system, the method comprising:
   transmitting control information on a first carrier;
   receiving a packet in a first time interval on a second carrier based on the control information;
   transmitting feedback information corresponding to the packet on the first carrier; and
   receiving the packet retransmitted in a second time interval having a time duration equal to a time duration of the first time interval, on the second carrier based on the feedback information, wherein the time duration of the first time interval includes one of a first duration and a second duration longer than the first duration based on the control information, and wherein a first start time is different from a second start time, the first start time represents a start time of the first time interval if the time duration of the first time interval includes the first duration, and the second start time represents the start time of the first time interval if the time duration of the first time interval includes the second duration.

6. The method of claim 5, wherein the control information includes information about a start time and the time duration of the first time interval.

7. The method of claim 5, wherein the first start time and the second start time are corresponded to a start position of each of partitions determined by dividing a firstly allocated uplink subframe.

8. The method of claim 5, wherein a start time of a second uplink time interval is a time after the time duration of the first time interval.

9. A mobile station in a multicarrier communication system, the mobile station comprising:
   a transceiver; and
   a processor configured to control the transceiver to:
      receive control information on a first carrier;
      transmit a packet in a first time interval on a second carrier based on the control information;
      receive feedback information corresponding to the packet on the first carrier; and
      retransmit the packet in a second time interval having a time duration equal to a time duration of the first time interval, on the second carrier based on the feedback information,
   wherein the time duration of the first time interval includes one of a first duration and a second duration longer than the first duration based on the control information, and
   wherein a first start time is different from a second start time, the first start time represents a start time of the first time interval if the time duration of the first time interval includes the first duration, and the second start time represents the start time of the first time interval if the time duration of the first time interval includes the second duration.

10. The mobile station of claim 9, wherein the control information includes information about a start time and the time duration of the first time interval.

11. The mobile station of claim 9, wherein the first start time and the second start time are corresponded to a start position of each of partitions determined by dividing a firstly allocated uplink subframe.

12. The mobile station of claim 9, wherein a start time of a second uplink time interval is a time after the time duration of the first time interval.

13. A base station in a multicarrier communication system, the base station comprising:
   a transceiver; and
   a processor configured to control the transceiver to:
      transmit control information on a first carrier;
      receive a packet in a first time interval on a second carrier based on the control information;
      transmit feedback information corresponding to the packet on the first carrier; and
      receive the packet retransmitted in a second time interval having a time duration equal to a time duration of the first time interval, on the second carrier based on the feedback information,
   wherein the time duration of the first time interval includes one of a first duration and a second duration longer than the first duration based on the control information, and
   wherein a first start time is different from a second start time, the first start time represents a start time of the first time interval if the time duration of the first time interval includes the first duration, and the second start time represents the start time of the first time interval if the time duration of the first time interval includes the second duration.

14. The base station of claim 13, wherein the control information includes information about a start time and the time duration of the first time interval.

15. The base station of claim 13, wherein the first start time and the second start time are corresponded to a start position of each of partitions determined by dividing a firstly allocated uplink subframe.

16. The base station of claim 13, wherein a start time of a second uplink time interval is a time after the time duration of the first time interval.

* * * * *